(12) United States Patent
Peri-Glass et al.

(10) Patent No.: US 9,098,635 B2
(45) Date of Patent: Aug. 4, 2015

(54) METHOD AND SYSTEM FOR TESTING AND ANALYZING USER INTERFACES

(75) Inventors: Yaron Peri-Glass, Raanana (IL); Don J. O'Riordan, Sunnyvale, CA (US); Erica Brand, Palo Alto, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1374 days.

(21) Appl. No.: 12/143,174

(22) Filed: Jun. 20, 2008

(65) Prior Publication Data

US 2009/0320002 A1    Dec. 24, 2009

(51) Int. Cl.
*G06F 9/44*    (2006.01)
*G06F 11/36*   (2006.01)

(52) U.S. Cl.
CPC ............ *G06F 11/3688* (2013.01); *G06F 8/38* (2013.01)

(58) Field of Classification Search
None
See application file for complete search history.

(56) References Cited

U.S. PATENT DOCUMENTS

| | | | |
|---|---|---|---|
| 5,600,789 A | 2/1997 | Parker et al. | |
| 5,918,037 A * | 6/1999 | Tremblay et al. | 716/132 |
| 6,854,089 B1 | 2/2005 | Santee et al. | |
| 6,907,599 B1 * | 6/2005 | Kashai et al. | 717/137 |
| 6,944,848 B2 * | 9/2005 | Hartman et al. | 717/124 |
| 7,024,345 B1 * | 4/2006 | Stamm et al. | 703/14 |
| 7,774,746 B2 | 8/2010 | Mansfield et al. | |
| 7,827,532 B2 * | 11/2010 | Rosaria et al. | 717/125 |
| 7,913,231 B2 * | 3/2011 | Stienhans et al. | 717/125 |
| 7,958,454 B2 * | 6/2011 | Gaudette | 715/763 |
| 8,387,005 B1 | 2/2013 | Ghosh-Roy et al. | |
| 8,433,550 B2 * | 4/2013 | Rheaume | 703/8 |
| 8,510,718 B2 | 8/2013 | Hemade | |
| 8,549,483 B1 | 10/2013 | Bridges et al. | |
| 2002/0156608 A1 * | 10/2002 | Armbruster et al. | 703/14 |
| 2005/0060132 A1 * | 3/2005 | Hollander et al. | 703/14 |
| 2006/0156274 A1 | 7/2006 | Andreev et al. | |
| 2007/0033441 A1 | 2/2007 | Sathe et al. | |
| 2008/0052690 A1 * | 2/2008 | Bharadwaj | 717/140 |
| 2008/0263506 A1 | 10/2008 | Broadfoot et al. | |
| 2008/0263511 A1 | 10/2008 | Shapiro | |
| 2009/0089725 A1 | 4/2009 | Khan | |
| 2010/0162214 A1 | 6/2010 | Hoff | |
| 2010/0211934 A1 | 8/2010 | Simons et al. | |
| 2011/0173603 A1 | 7/2011 | Nakamura et al. | |
| 2012/0233582 A1 * | 9/2012 | Ardeishar et al. | 716/136 |

FOREIGN PATENT DOCUMENTS

EP    1372086 A1    12/2003

OTHER PUBLICATIONS

"RTL Hardware Desing Using VHDL: Coding for Effeiency, Portability, and Scalability" by Pong P. Chu, Jun. 12th, 2006, p. 313, [online],[retrieved on Mar. 20, 2013]. Retrieved from <http://academic.csuohio.edu/chu_p/rtl/chu_rtL_book/rtl_chap10_fsm.pdf>.*

(Continued)

*Primary Examiner* — Li B Zhen
*Assistant Examiner* — Evral Bodden
(74) *Attorney, Agent, or Firm* — Vista IP Law Group, LLP

(57) ABSTRACT

A system and method is described in which the state of the art in automated software applications is significantly improved. According to some approaches, interface testing is implemented and based upon a verification language and a verification environment. The system and method support the concepts of constrained random test generation, coverage, constrained random generation, and dynamic checks.

35 Claims, 30 Drawing Sheets

(56) References Cited

OTHER PUBLICATIONS

IEEE, "http://academic.csuohio.edu/chu_p/rtl/chu_rtL_book/rtl_chap10_fsm.pdf" by Tsun S. Chow, Sep. 18, 2006, pp. 1-10, [online], [retrieved on Mar. 20, 2013]. Retrieved from <http://ieeexplore.ieee.org/stamp/stamp.jsp?tp=&arnumber=1702519>.*

Non-Final Office Action for U.S. Appl. No. 12/796,361 Mailed on Aug. 7, 2012.

Edwards, Stephan A., "Design and Verification Languages", Nov. 2004.

Non-Final Office Action dated Jan. 16, 2013 for U.S. Appl. No. 12/796,361.

Final Office Action dated Jun. 13, 2013 for U.S. Appl. No. 12/796,361.

Yuanhua Liu, Anna-Lisa Osvalder and MariAnne Karlsson (2010). Considering the Importance of User Profiles in Interface Design, User Interfaces, Rita Matrai (Ed), InTech, Available from: http://www.intechopen.com/books/user-interfaces/considering-the-importance-of-user-profiles-in-interfacedesign. Last retrieved Jul. 26, 2013.

World of Computing, Artificial Intelligence, Heuristic Search, Dec. 14, 2009, last retrieved from http://intelligence.worldofcomputing.net/ai-search/heuristic-search.html# on Jul. 26, 2013.

World of Computing, Artificial Intelligence, Depth First Search, Dec. 18, 2009, last retrieved from http://intelligence.worldofcomputing.net/ai-search/depth-first-search.html on Jul. 26, 2013.

Architecture for Automated Graphical User Interface Tests to Maximize Reuse, IBM, Jun. 30, 2006, IPCOM000137946D.

Non-Final Office Action dated Aug. 1, 2013 for U.S. Appl. No. 12/796,387.

Mark S. Miller, "Block Structure", 1999, URL: http://www.erights.org/elang/blocks/index.html.

Mark S. Miller, "Expression Grammar", 1999, URL: http://www.erights.org/elang/grammar/expr.html.

Mark S. Miller, "Kernel-E Reference", 1999, URL: http://www.erights.org/elang/kernel/index.html.

Mark S. Miller, "Lexical Grammar", 1999, URL: http://www.erights.org/elang/grammar/lexical.html.

Mark S. Miller, "Methods and Matchers", 1999, URL: http://www.erights.org/elang/grammar/dispatchee.html.

Mark S. Miller, "Pattern Grammar", 1999, URL: http://www.erights.org/elang/grammar/patterns.html.

Mark S. Miller, "Primitive Expressions", 1999, URL: http://www.erights.org/elang/grammar/prim-expr.html.

Mark S. Miller, "Quasi-Literals", 1999, URL: http://www.erights.org/elang/grammar/quasi-overview.html.

Verisity, "e Language Reference Manual", 1998.

Non-Final Office Action dated Sep. 27, 2013 for U.S. Appl. No. 12/796,361.

Sakunkonchak et al., Synchronization verification in system-level design with ILP solvers, Jul. 2005, 10 pages.

Final Office Action dated Feb. 13, 2014 for U.S. Appl. No. 12/796,387.

Notice of Allowance dated Mar. 20, 2014 for U.S. Appl. No. 12/796,361.

Notice of Allowance dated Jul. 18, 2014 for U.S. Appl. No. 12/796,387.

* cited by examiner

Figure 7A

```
extend sys {
  run() is also {
    //
    // --- LAUNCH SPECVIEW
    //
    gtx.launch("specview");
    // set delay of 1 second to allow the human eye to track the test
    //gtx.set_command_delay(1); debug gtx;
    //
    // --- PREPARE TO CHECK DB WINDOW
    //
    // load & test
    gtx.exec("load /user/yperi/OK.e");
    gtx.exec("test");
    // open DB window
    gtx.action("SYS").invoke();
    check that gtx.curr_window().get_title() ~ "/^Data Browser/";
```

702 — LAUNCH SPECVIEW block
704 — load & test block
706 — open DB window block
708 — arrow pointer

Figure 7B

```
// --- CHECK DB WINDOW
//

// set top expression: 'sys.packets'
gtx.combobox("ExpName").enter_item("sys.packets");

// check tree content
var row:= gtx.tree("DataTree").get_selected_row();
check that gtx.tree_row("DataTree", 0).get_name() == "sys";
check that gtx.tree_row("DataTree", row).get_name() == "packets";

// check that details header text
var size:= gtx.eval_int("sys.packets.size()");
check that gtx.label("DataHeaderText").get_text() ==
appendf("sys.packets: list of packet = %d items", size);
check that gtx.table("ListTable").get_row_count() == size;

// check that the expand adds the correct rows to the tree
check that ! gtx.tree("DataTree").is_row_expanded(row);
var row_count:= gtx.tree("DataTree").get_row_count();
gtx.tree("DataTree").click_row_handle(row);
check that gtx.tree("DataTree").is_row_expanded(row);
check that gtx.tree("DataTree").get_row_count() == (row_count + size);
```

```
// check 7 random childs (or less, if there are less)
var tree_steps:= min(3, size);
var visited_tree_childs: list of int;
for i from 1 to tree_steps {
    // choose random tree child
    var tree_child:= sys.gen_new_num(visited_tree_childs, size - 1);
    var tree_val:= gtx.eval_string(appendf(
"vt.instance_to_string(sys.packets[%d])", tree_child));

// check that the tree name & value is correct
    check that gtx.tree("DataTree").get_row_name(row + 1 + tree_child)
== appendf("packets[%d]", tree_child);
    check that gtx.tree("DataTree").get_row_value(row + 1 +
tree_child) == tree_val;

// do a print command on tree row
    gtx.tree("DataTree").click_row(row + 1 + tree_child);
    gtx.menu_item("Tools", "Print").click();
```

```
// walk on table (either fields or list)
    var table_name: string;
    if (gtx.tabcontrol("DataTab").is_enabled_tab(0)) {
        table_name = "FieldsTable";
    } else {
        table_name = "ListTable";
    };
    var table_size:= gtx.table(table_name).get_row_count();
    if (table_size > 0) {

// allow 4 steps on table
        var table_steps:= min(4, table_size);
        var visited_table_childs: list of int;

for j from 1 to table_steps {
            // choose random table child
            var table_child:= sys.gen_new_num(visited_table_childs, table_size - 1);

// select random child in table & perform a print command
            gtx.table(table_name).click_row(table_child);
            gtx.menu_item("Tools", "Print").click();
        };
    };

//
    // --- QUIT
    //
    gtx.exec("quit -f");
};
```

724

```
extend sys {
    run() is also {
        // --- LAUNCH SPECVIEW
        //
        gtx.launch("specview -p 'load gtx plugin tcp'");
```

FIG. 10

```
// open DB window
ACTION ("SYS").invoke();
check that CURR_WINDOW().get_title() - "/^Data Browser/";

// set top expression: 'sys.packets'
COMBOBOX("ExpName").enter_item("sys.packets");

//check tree content
var row:= TREE("DataTree").get_selected_row();           ← GUI Query
check that TREE("DataTree").get_row_name(0) == "sys";
check that TREE("DataTree").get_row_name(row) == "packets";
TREE("DataTree").expand_row(row)                         ← GUI Command
```

1105 — (// open DB window ... block)
1104 — TREE("DataTree")
1106 — TREE("DataTree")
1102 — TREE("DataTree").expand_row(row)

FIG. 11

```
var row : = sys.gen_new_num(visited_tree_childs, size - 1);
var tree_val:= BATCH().eval_string(append1(
"vt.instance_to_string(sys.packets[%d])", tree_child));

// do a print command on tree row
TREE("DataTree").click_row(row);
MENU_ITEM("Tools", "Print").click();
```

1202 — Generate BOX

1204 — Click Generate BOX

METHOD AND SYSTEM FOR TESTING AND ANALYZING USER INTERFACES

BACKGROUND AND SUMMARY

The invention is directed to an improved approach for testing and verifying user interfaces.

Most computing devices, applications, and complex tools rely upon a user interface to interact with, receive input from, and provide information to users. There are many types of user interfaces. Common approaches to implement user interfaces include the graphical user interface (GUI), character user interface (CUI), and web-based user interfaces.

Like any other development process for a complex design, it is important to ensure that the process for developing a user interface involves adequate testing and verification of the performance and functionality of the interface components. In the field of computer science, GUI software testing is the process of testing a product that uses a Graphical User Interface (GUI), to make sure it meets its written specifications. This is normally done through the use of a variety of test cases, in addition to ad-hoc methods involving human interaction.

To generate a comprehensive set of test cases however, the test designer must be certain that their suite covers all the functionality of the system and also has to be sure that the suite fully exercises the GUI itself. The difficulty in accomplishing this task is twofold: one has to deal with domain size and then one has to deal with sequences. In addition, the tester faces more difficulty when they have to do regression testing.

The size problem can be easily illustrated. Unlike a CLI (Command Line Interface) system, a GUI has many operations that need to be tested. A very small program such as Microsoft WordPad has at least 325 possible GUI operations. In a large program, the number of operations can easily be an order of magnitude larger.

One possible testing approach is to perform "capture/playback." Capture/playback is an approach where the system screen is "captured" as a bitmapped graphic at various times during system testing. This capturing allowed the tester to "playback" the testing process and compares the screens at the output phase of the test with expected screens. This validation could be automated since the screens would be identical if the case passed and different if the case failed.

However, there are significant problems when one tries to implement capture/playback in a complex system, such as most GUI based systems. The most obvious problem one finds is that the screen in a GUI system may look different while the state of the underlying system is the same, making automated validation extremely difficult. This is because a GUI allows graphical objects to vary in appearance and placement on the screen. For example, fonts may be different and window colors or sizes may vary, even though the system output is basically the same. This would be obvious to a user, but not obvious to an automated validation system.

To combat this and other problems, another approach is to go 'under the hood' and collected GUI interaction data from the underlying windowing system. By capturing the window 'events' into logs, the interactions with the system are now in a format that is decoupled from the appearance of the GUI. The advantage is that the event streams are captured. Unfortunately, significant filtering of the event streams becomes necessary when using this approach since the streams of events are usually very detailed and most events are not directly relevant to the functionality being targeted by the GUI test.

In practice, it often also turns out that the overhead of maintaining regression tests across multiple software releases is sufficient to discourage the use of automated GUI testing in the first place, in spite of its otherwise apparent advantages and necessity. This essentially means that existing GUI tests are not easily reusable, and most be extensively modified before being used for varied GUI configurations.

Another possible approach to running tests on a GUI is to build a driver into the GUI so that commands or events can be sent to the software from another program. This method of directly sending events to and receiving events from a system is highly desirable when testing, since the input and output testing can be fully automated and user error is eliminated. However, this method is significantly limited by the fact that software GUIs tend to change from software release to release. Even though the underlying software major functionality may not change, the fact that the GUI itself changes is often sufficient to induce a major maintenance overhead requiring manual regeneration of tests. Further issues arise in that particular solutions are limited to a single specific application only, such that reuse of the test infrastructure across multiple similar or differing applications is not possible.

Therefore, it is clear that there is a need for an improved approach to perform testing of user interfaces. A system and method is described in which the state of the art in automated software applications is significantly improved. According to some embodiments, interface testing is implemented and based upon a verification language and a verification environment.

Other and additional objects, features, and advantages of the invention are described in the detailed description, figures, and claims.

BRIEF DESCRIPTION OF FIGURES

FIGS. 7A-D illustrate an example test in an extended "e" language.

FIG. 10 shows a code portion for performing launch and initiation.

FIG. 11 shows a code portion for performing test driving, querying, and checking.

FIG. 12 shows a code portion for random value generation.

FIGS. 24 and 25 show additional interfaces for displaying and managing regression testing according to some embodiments of the invention.

DETAILED DESCRIPTION

The present invention provides a method, system, and computer program product for testing and analyzing user interfaces. A novel system and method is presented in which the state of the art in automated software applications is significantly improved. For the purposes of explanation, the present document will be illustrated and explained with reference to Graphical User Interface (GUI) based applications as well as Character User Interface (CUI) applications. It is noted, however, that the present invention can be applied to any type of user interface, and is not to be limited to the specific examples illustrated herein.

Figure 1:
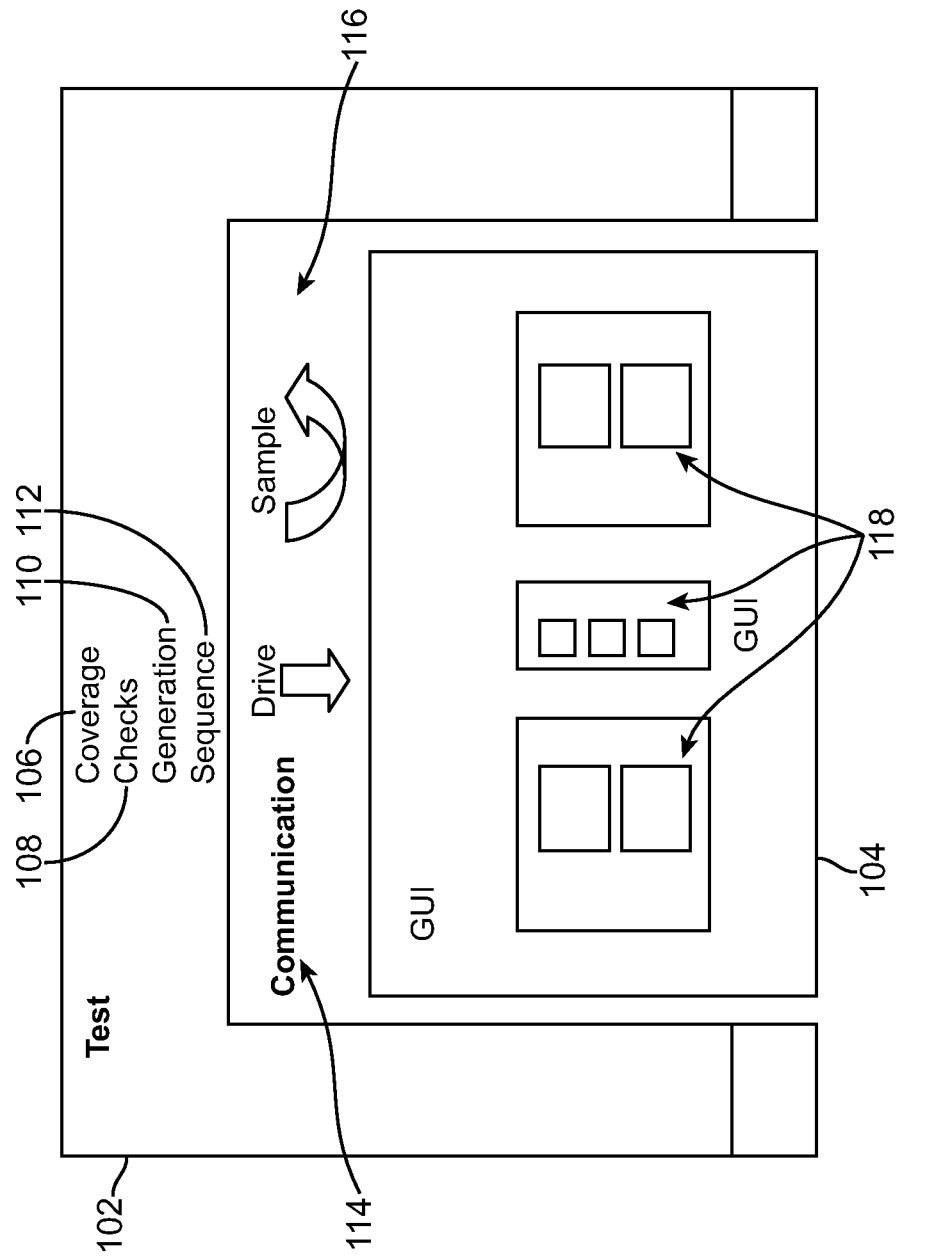
FIG. 1 shows a high-level diagram of an architecture for performing interface testing according to some embodiments of the invention.

FIG. 1 shows a high level architectural view of one embodiment of the invention that includes a testbench 102 and an application under test (AUT) 104. The AUT 104 comprises a GUI having numerous GUI elements 118. The coding of the testbench 102 is used to drive and stimulate the GUI elements 118 within the AUT 104. As the testbench 102 is executed, it communicates with the GUI for the Application Under Test 104 via a communications channel 114. Data sampling is performed to collect the data 116 representing results of stimulating the AUT 104 with die testbench 102.

According to some embodiments of the invention, an electronic design verification environment can be used to implement the architecture of FIG. 1. A Hardware Verification Language (HVL) is modified and extended such that, instead of interfacing with simulation of a hardware device modeled in a language such as Verilog or VHDL, it instead interfaces with the Graphical/Character User Interface (GUI/CUI) 118 of the target AUT 104. The testbench 102 in the verification language then drives the AUT 104 by generating and providing a GUI/CUI stimulus which emulates user behavior or external behavior, by collecting AUT status and optionally GUI status, and by comparing the identified status against an expected status. In one embodiment, the testbench 102 can be implemented using the "e" language, specifications of which are available from Cadence Design Systems of San Jose, Calif. A suitable verification environment is provided by the Specman tool, also available from Cadence Design Systems of San Jose, Calif. Other verification languages and environments can be used in conjunction with, and within the spirit of, the invention.

The advantage of using a HVL is that the process of performing GUI testing implicates many similar problems that have been faced in the past by ASIC designers, who were forced to use Hardware Description Languages (HDL's) such as Verilog and VHDL to test their hardware designs. The verification engineers found the levels of abstraction allowed for by these languages to be insufficient, which forced the evolution of a new class of languages dedicated to verification of hardware designs. The resulting HVLs, e.g., the 'e' language, introduced higher order constructs for dealing specifically with verification problem.

In similar spirit, the invention described herein addresses the issue of software application and GUI testing at a much higher level of abstraction than allowed for by the commonly employed tools. Language features of HVL's are employed, along with appropriate improvements and extensions to render said HVL's and their associated regression management and analysis environments applicable to GUI testing. Use of a HVL-like approach to GUI testing as described herein will allow the GUI verification engineer to use a language, which is designed for complex state and sequence testing, for the authoring of GUI test cases, including their abilities to write constraint-based randomized tests in addition to directed tests.

The invention can be employed in conjunction with regression management and test plan authoring tools to allow GUI verification personnel to define exactly what they want to verify, to write and formally capture a verification plan, and formally define the required coverage points. The vManager product, available from Cadence Design Systems of San Jose, Calif., is an example of a tool that can be used in conjunction with the invention used to perform regression management in a GUI-testing environment and to allow engineers to create a testbench 102. Using a test plan regression manager also allows the software verification or quality assurance engineer to set up a targeted regression involving multiple tests, to run regressions using the same tests with multiple seeds (which control the random number generation process), to analyze the regression results in terms of passed/failed checks, to automatically re-run failed checks while preserving the random seed as necessary, and finally to explicitly analyze and identify those areas of high GUI state coverage and low or missing coverage. The tracked testing metrics provide feedback for the GUI designers and product managers for the aim of robust product test and development.

As noted above, the testbench 102 communicates with the GUI elements 118 in the AUT 104 using a communications channel 114. In some embodiment, the communications channel 114 is implemented via a socket connection, making it possible for the testbench execution and the AUT execution to be in separate operating system processes, or even on separate machines. Other forms of inter-process communication may also be used instead. In yet another embodiment, the testbench 102 and AUT components 118 may be combined within a single operating system (OS) process. The communications channel 114 provides a medium that facilitates the testbench 102 driving the AUT 104, and that allows the AUT 104 to respond to those events, in addition to providing query application programming interfaces (APIs) through which the testbench 102 can obtain GUI object values (such as, for example, button state, values of text strings within a type in field) from the AUT 104.

The testbench 102 is configured to provide an improved approach to address test coverage 106. It is generally very difficult to know with any level of confidence or accuracy just how representative a set of GUI tests are in terms of covering all of the possible states of a GUI. With increasing functionality being provided in successive software releases, the number of valid GUI states that can be arrived at for any given software application is exponentially increasing over time. To ensure a representative set of tests are used to achieve a decent level of state coverage, some embodiments of the invention provides the ability to measure or otherwise quantify the degree of GUI state coverage provided by a testbench 102.

The testbench 102 can also be used to configure the checks 108 that are used to query and verify the operation and functionality of the GUI 104 and its components 118. Examples of such checks 108 are described in more detail below.

One benefit of using a verification language (such as the "e" language) to author the testbench 102 includes the ability to generate 110 constrained (i.e. legal) random values and sequences of values. This effectively allows a test to be authored as a template, during the execution of which the template is realized into a sequence of concrete tests via a randomization process. A single test template can thus be used to generate a multitude of actual tests and scenarios during the run time of the tests, and exercise multiple "flavors" of the specified scenario.

Another benefit of the present approach is that sequencing 112 can be addressed using the testbench 102. This is extremely useful since some functionality of the AUT 104 may only be accomplishable by following a complex sequence of GUI events. For example, to open a file a user may have to engage in a long sequence of operations that include clicking on the "File" menu, selecting the "Open" operation, using a dialog box to specify the file name, and then focusing the application on the newly opened window. This type of sequence can be specified in testbench 102.

These new schemes lead to tremendous increases in software application testing productivity, especially in the GUI based applications, and present a vast reduction in the overhead required for release-to-release testcase maintenance. Though the examples described herein are with respect to GUI's and GUI verification, the reader will understand that these are intended to be exemplary only, and that the spirit of the invention as a whole is not limited to just that of GUI/CUI verification and validation. Other complex state-based systems can equally be verified by a similar approach, with application-specific components being used to substitute the GUI/CUI-specific components described herein during the augmentation or extension of existing or yet-to-be-determined Hardware Verification Languages.

Figure 2:
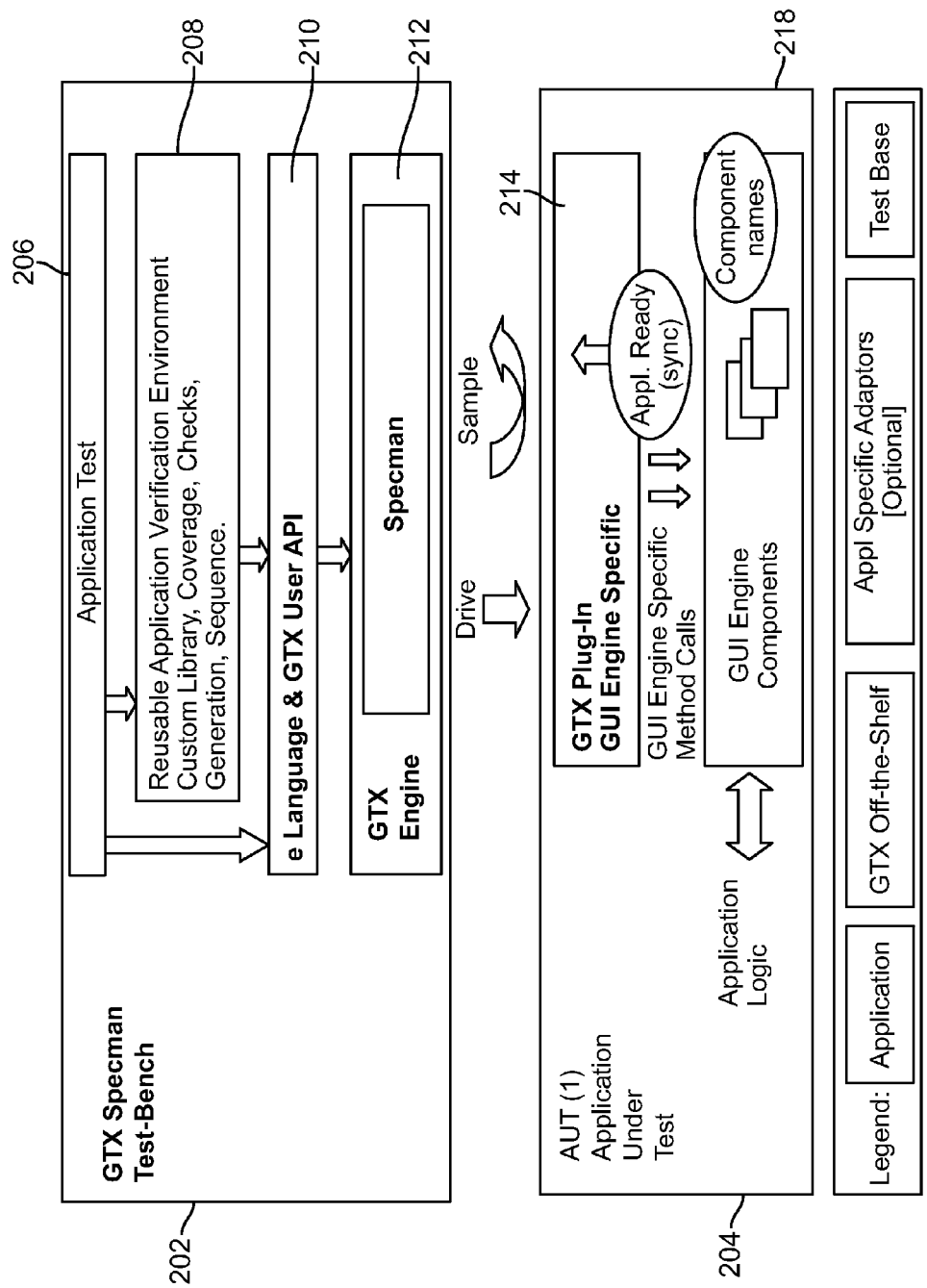
FIG. 2 shows a more-detailed diagram of an architecture for performing interface testing according to some embodiments of the invention.

FIG. 2 shows a more detailed diagram of an embodiment of an architecture for implementing the invention. The illustrated architecture includes two major components, the Testbench or "server" side 202 which generates the AUT drive/command and sample/query messages, and the AUT or "client" side 204 which receives and responds in kind to those messages. As used herein, the testbench side 202 may also be referred to as the "GTX" side or component.

The testbench "server" side 202 extends the standard HVL environment in two major areas. First, an API 210 is provided for driving the GUI of the AUT, and for sampling the state of that GUI. This API 210 is implemented, for example, using "e" language classes and methods. Second, a communications channel is provided that connects to the AUT. The server side API 210 is responsible for communication of the GUI commands to the AUT client, and for making the results of GUI queries available to the application test 206.

In addition to the "e" Language and GTX User API for GUI Command/Query, GUI verification engineers can define additional GUI Verification IP in the form of a custom library or libraries 208, and specify coverage requirements, checks that are to be performed, sequences that are to be generated, and other testing attributes. In one embodiment, these components can be defined using the extended "e" Language.

The application test 206 is authored in the extended "e" language, and can either be written directly using the language extensions described via examples herein, or by instantiating/calling GUI Verification IP stored in customer libraries, as described above, or both. The application test 206 is configured to include calls to the API 210.

The combined form of the application test 206 and library extensions 208 are processed by the verification engine 212 and used to send drive messages to stimulate the GUI application. The verification engine also sends query messages to the GUI application to gather information about the state of the GUI.

On the application "client" side 204, a GUI application is extended via incorporation of a Plug-in 214 (denoted GTX Plug-In in the figure). The plug-in is a GUI toolkit specific implementation which translates the GUI drive commands and query messages from the testbench server into actual calls to the underlying GUI toolkit. Each underlying type of application would correspond to a plug-in 214 that is configured to interface to the correct respective language. For example, plug-ins can be configured to translate the drive commands and query messages into Java, Qt, Tcl/Tk, or any other suitable interface format. The plug-in would present the test messages into GUI engine-specific method calls, such as button.click( ), text.get( ), and similar calls. Plug-ins 214 can be authored for any such GUI implementation/language. The plug-in 214 also implements the client side of the communications protocol, communicating the results of GUI Drive and Query commands back to the testbench "server" side 202.

Figure 3:
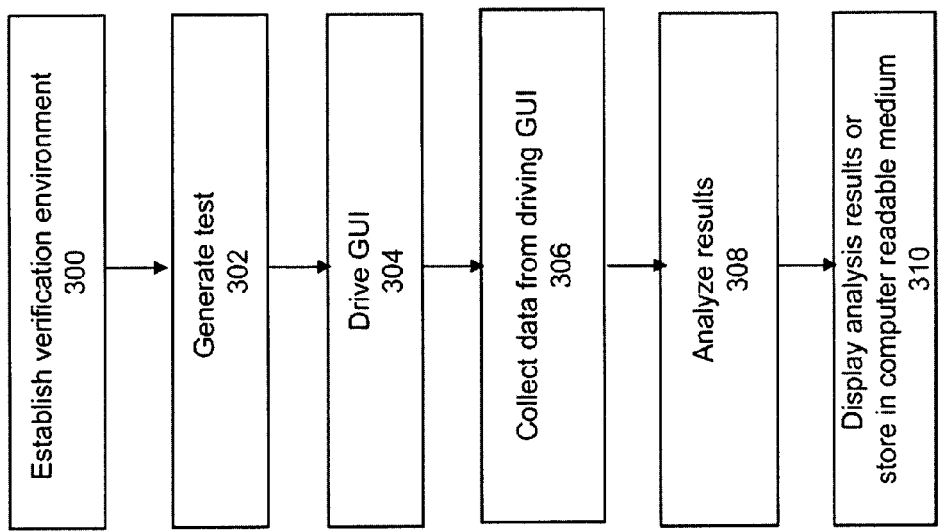
FIG. 3 shows a flowchart of a process for testing an interface according to some embodiments of the invention.

FIG. 3 shows a flowchart of a process for utilizing the architecture of FIG. 2. The process begins at 300 by establishing a verification environment (VE) for each application under test. This VE (which can be placed in a GUI verification IP library), includes a set of "e" language files which define classes and behavior that are shared by all of the tests of the specific application. This methodology allows for a significant degree of code reuse. A VE may include, for example, at least 3 types of classes, and potentially many more. A number of application and functionality-specific tests are then authored in extended HVL language. These testbenches import or reference the AUT-specific VE defined in the verification IP libraries, in addition to more genetically written non-AUT-specific verification IP that can verify more basic test level functionality. This more basic verification IP may also be placed in a verification IP library.

One example type of Verification Environment class or code behavior is a specific application launcher class. This class or code would allow the testbench author to launch the application using various methods, including a simple launch or a launch-with-command-line-arguments, and could easily be extended to handle additional launch requirements.

A second example type of class or code behavior is the specific application class. The application class inherits from the base application class and its methods relate to application specific logic, providing application window creation (constructor), initialization and query methods, in addition to other classes representative of the application's primary design architecture and logic. Further, in the case where the AUT supports a CUI in parallel to the GUI, the application class supports the required API.

A third example type of class comprises the various specific window classes, such as a main window class, any sub-window classes, etc, and reflects the various types of windows and sub-windows in the application, and their relationships. These classes further contain references to window-specific logic, including the various sub-widgets (such as trees, toolbars, or buttons) comprising the window or sub-window. The intent of these methods according to one embodiment is to create HVL language handles to AUT main window widgets only once. This reference is then returned anonymously, and it is that class method which is used in all tests that need to reference and manipulate objects such as windows, primary widgets, tree structures, etc. in the AUT application. Should that those objects get renamed or re-parented, the tests calling the method of the AUT main window application class will be unaffected. This is one of the advantages of the present invention, in which it provides a system in which specific application tests are insulated form various changes in the GUI itself as the software evolves across releases.

At 302, the application test is created. The application test comprises a set of statements to test the GUI written in a suitable verification language, such as the "e" language. API calls are embedded into the application test to drive the actions that are needed to test the GUI. The embedded calls also provide the basis for generating query calls to check the state of the GUI at various points in time and to obtain information about the GUI. The application test may also incorporate or call other test components that may be stored in one or more libraries. Any GUI element and component can be stimulated using the application test. The following are some example GUI elements that can be tested in certain embodiments:

WINDOW,
BUTTON,
ACTION,
CHECKBOX,
RADIO BUTTON,
COMBOBOX,
LISTBOX,
TEXTBOX,
TEXTAREA,
LABEL,
TABCONTROL,
TABLE,
TABLE_ROW,
TOOLBAR_BUTTON,
MENU,
MENU_ITEM,
TREE,
TREE_ROW,
WINDOW
CANVAS,
SCROLLBAR,
IMAGE,
PANEL.
SPLIT_PANEL

The API would include a method/interface to address each of the supported GUI elements. These methods would include mechanism to initialize, drive, manipulate, operate, and/or to query these elements.

At 304, the application test is processed by the verification engine to drive the GUI being tested. In operation, the verification engine parses through the application test to identify the test instructions. The test instructions are communicated over a communications channel to the plug-in that is incorporated with the application under test. The plug-in translates the test instructions into the appropriate format suitable to the GUI application. The translated test instructions are then applied to the GUI to perform the specified test operations, which are essentially a set off operations that performs actions and functions within the GUI.

Data collection instructions are processed at 306. This occurs by having the verification engine parse the application test to identify the specific types of information that are being sought by or for the test. A set of query commands would then be sent from the verification engine at the test side to the plug-in at the application side. The query commands would be processed by the plug-in to capture the requested information from the GUI or to capture the state of some or all of the GUI.

The collected data from the GUI is then returned for analysis at 308. Analysis may be performed to determine whether the GUI has properly performed the operations being tested by the application test. One approach to implement this action is to maintain a set of expected GUI results for each test that is checked against the actual results of applying the test to the GUI. Each test can receive a "pass" or "fail" indication depending upon whether the collected test results sufficiently matches the expected results.

At 310, the analysis results are either/both displayed to the user at a computer display device or stored into a compute readable medium. A regression test manager product can also be used to facilitate display and analysis of the test results.

Figure 4:
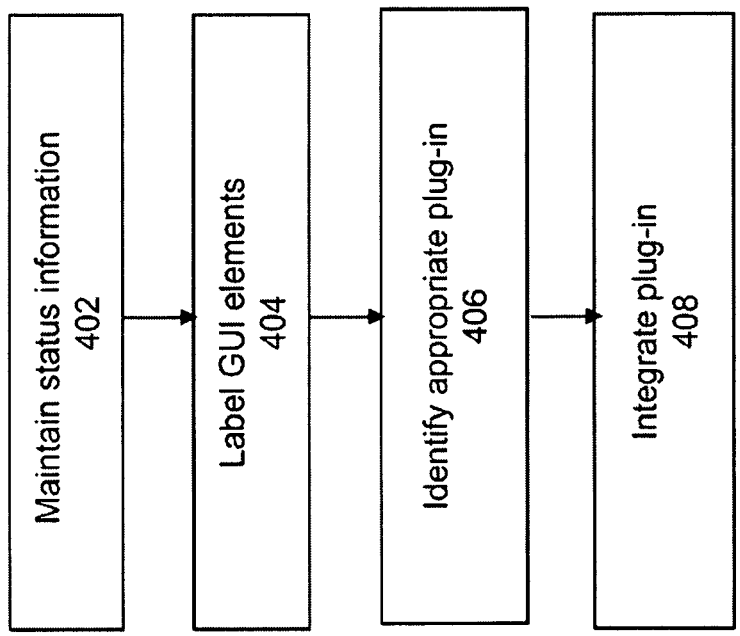
FIG. 4 shows a flowchart of a process for configuring an application to be tested according to some embodiments of the invention.

FIG. 4 shows a flowchart of a process for preparing an application to be tested using the architecture of FIG. 2. At 402, the application is configured to maintain and provide status information relevant to its testing. For example, the AUT can be configured to allow its "busy" status to be determined by the testbench, e.g., in terms of its readiness to accept/respond to new GUI commands and queries. This is done by providing query methods in the AUT that allow its busy state to be determined. This approach is suitable to be used by the communication protocol since some GUI commands take a long time to execute resulting in a busy AUT state for some period of time.

At 404, a component naming scheme may be incorporated with the AUT. This may be implemented for each GUI component which is to be driven or queried, and allows an approach by which it registers a unique object name for each component. In one embodiment, the object name is not seen or used by the user of the AUT; it is however used internally during the communication of messages to ensure that desired messages are always delivered to the same object, regardless of its regular widget name or position in the AUT widget hierarchy. This is done in order to facilitate preservation of test functionality across multiple relatively minor revisions of the AUT widget hierarchy.

As long as a given component/functionality doesn't change its registered name, it can be freely moved in the widget hierarchy of the AUT during the development cycle, without unduly impacting GUI tests. For example, the object (e.g., such as a "Load" button) can be re-parented in a new or different enclosing layout management widget, without changing its registered name. This provides a very significant advantage for the invention with regard to extensibility and scalability, since testbenches written in conjunction with the original AUT GUI layout scheme will therefore continue to work with the new layout scheme. This represents a significant improvement over the current state of the art.

At 406, the appropriate plug-in is identified for the AUT. The consideration of the appropriate plug-in is driven by the type and format of the GUI implementation. For example, Java, Qt, and Tcl/Tk are just some examples of the formats with which the GUI application may be implemented. According to one embodiment, each such format corresponds to a different plug-in. The AUT is configured to include appropriate software hooks for the plug-ins using any suitable or conventional techniques. Thereafter, at 408, once the appropriate plug-in has been identified, the plug-in is integrated with the AUT.

Figure 5:
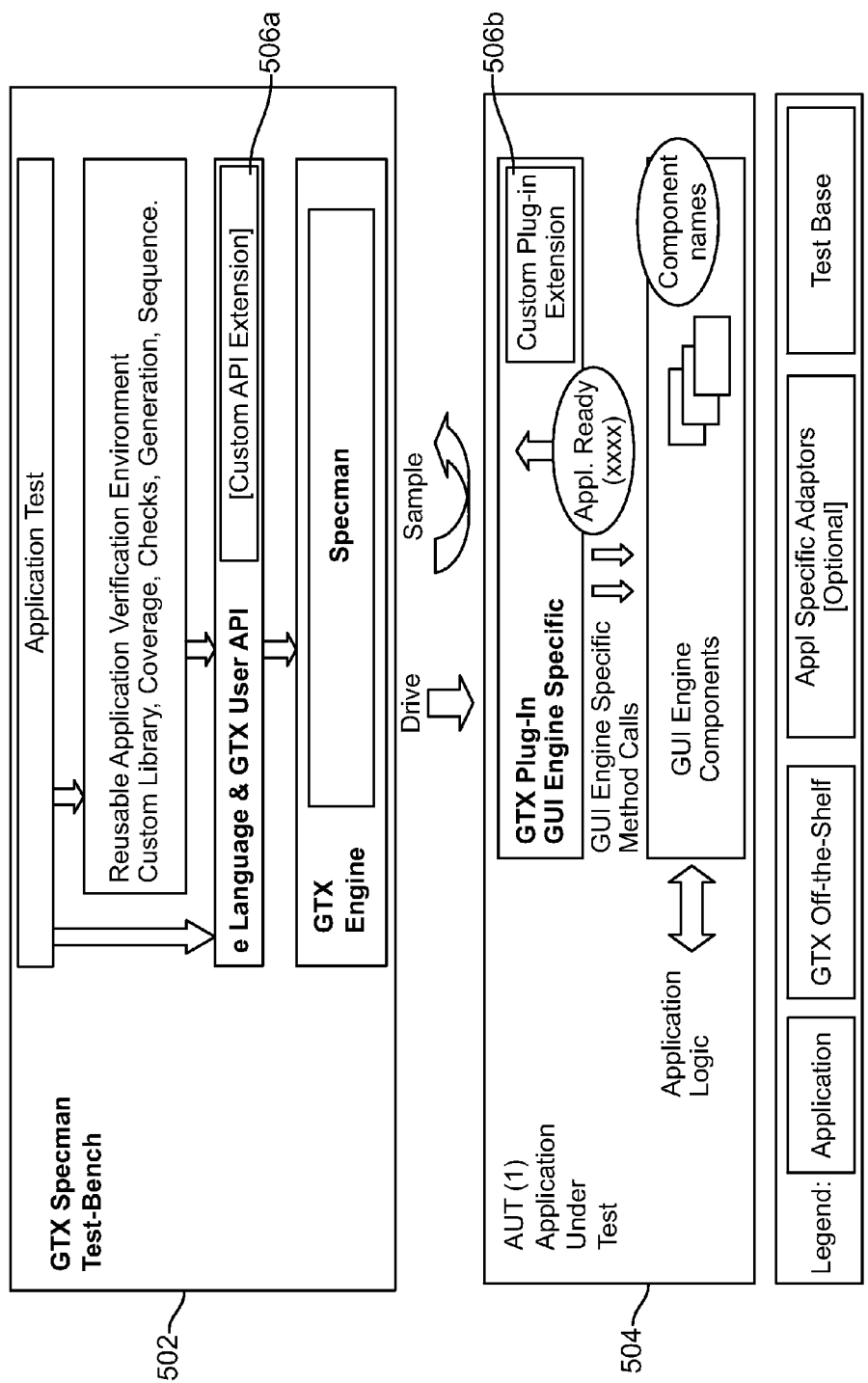
FIG. 5 shows a diagram of an architecture for performing interface testing with extensible programming interfaces according to some embodiments of the invention.

FIG. 5 shows an alternate embodiment to the architecture of FIG. 2, in which provisions are made to allow for custom API extensions 506a and 506b. This approach is provided to support applications to provide and utilize extensions to the regular GUI toolkit API. For example, an extension may be used to provide a new kind of specialized file browser component which supports additional GUI commands and queries over the original file browser provided by the native GUI toolkit. As another example, custom Java implementations could be supported using the extensions.

Such extensions are implemented as necessary as a plug-in extension 506b on the AUT side 504 (in which the new GUI components are implemented), and as a corresponding plug-in extension 504a on the application test side 502 (in which corresponding new GUI Drive and Query methods are provided). This extension mechanism allows testbenches to be extended to work in conjunction with specialized or customized GUI toolkit versions. The nature of the testbench extensions 506a can be implemented via sub-classing of, or introduction of new classes that share some of the same base classes, as the original API, as may also be the case for the extensions 506b in the AUT side.

Figure 6:
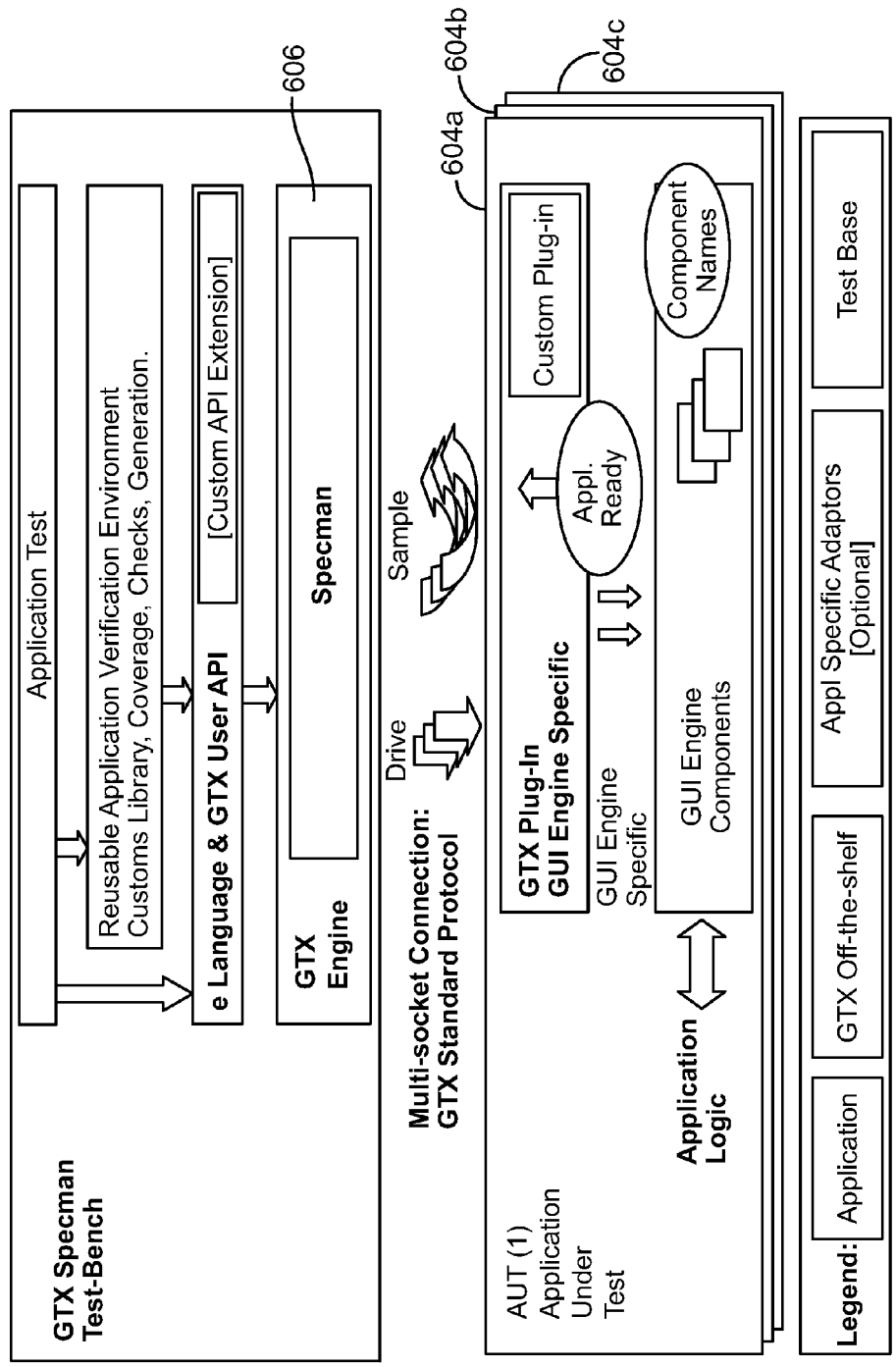
FIG. 6 shows a diagram of an architecture for performing interface testing with support for multiple AUTs according to some embodiments of the invention.

FIG. 6 illustrates an embodiment of the invention which supports multiple socket connections to multiple applications-under-test 604a, 604b, and 604c. The standard drive and query protocols would be sent from the verification engine component 606 to each of the applications-under-test 604a, 604b, and 604c. Since each of the AUTs 604a, 604b, and 604c have the correct plug-in for that respective AUT, the standard protocol can be translated as needed to satisfy the format requirements of each AUT.

As noted above, the verification system includes an API having method(s)/interface(s) to address each of the supported GUI elements. These methods would include mechanism to initialize, drive, manipulate, operate, and/or to query these elements. According to one embodiment, the API design revolves around four main classes or role players:

Application
Window
Widget
Verification Manager

There are pre-defined relationships between some of those players. In particular, an application contains a group of windows which can be opened. Each window belongs to a specific application, and contains a set of widgets. Each widget belongs to a specific window.

Each of the above players also has a set of related operations. More specifically, the "physical" GUI classes (application, window and widget) have some GUI related operations, to simulate user activity. For example, an application can correspond to batch related API components, e.g., to perform a command or evaluation (which can be syntactically represented by "do_cmd( )" and "eval_exp( )"). A window can correspond to operations to move the window to the front, move the window, or to resize the window (which can be syntactically represented by "to_front( )", "move( )", and "resize( )"). A table widget can correspond, to operations to click on a row, double click a row, or to click a column header (which can be syntactically represented by "click_row( )", "double_click_row( )", and "click_col_header( )"). The Verification/GTX Manager can be configured to implement the operation to launch an application (which can be syntactically represented by "launch_application( )").

Each of the above players also corresponds to a set of accessor/query methods. For example, an application player may correspond to a method such as get all windows (which can be syntactically represented by "get_all_windows( )"). A window player can correspond to methods to get the size, title, or widgets of the window (which can be syntactically represented by "get_size( )", "get_title( )", and "get_all_widgets)"). A table widget player can correspond to query methods to get widget attributes, get row attributes, sorting, or enabling (which can be syntactically represented by "get_attributes( )", "get_Row_attributes( )", "is_sorted( )", and "is_enabled( )"). The Verification/GTX Manager can correspond to a method to get all applications (which can be syntactically represented by "get_all_applications( )").

Testbenches are written in the extended "e" language which creates instances of those classes, invokes the various operational methods to drive the GUI of the AUT, and invokes the accessor/query methods to determine (and thus be able to verify) the actual state of the GUI, comparing it against the expected state.

Figure 8:
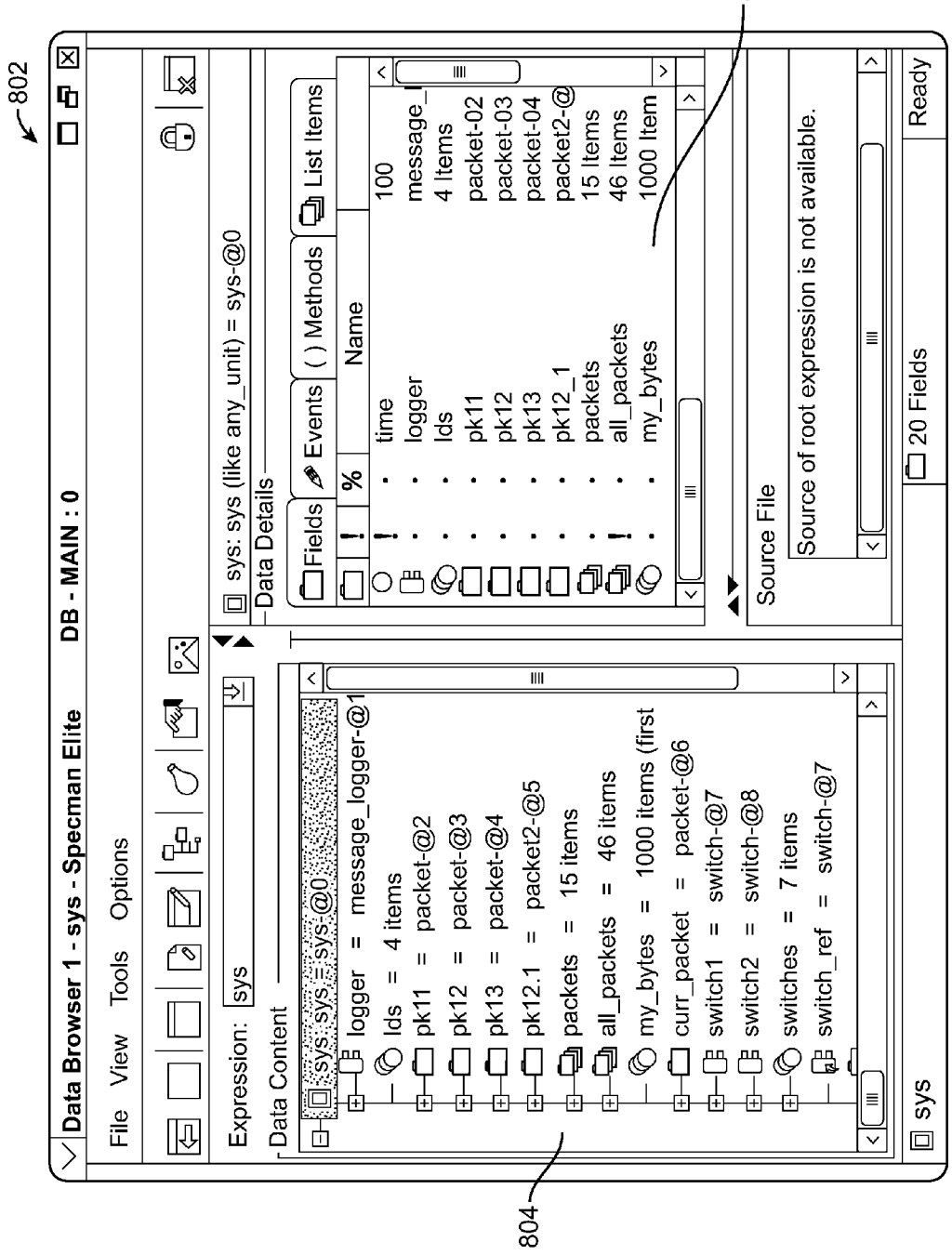
FIG. 8 illustrates an example user interface to be tested by the tests of FIGS. 7A-D.

To illustrate embodiments of the invention, consider the example GUI 802 shown in FIG. 8. This GUI example 802 is part of a "Data Browser" AUT. The Data Browser application can be used, for example, for showing and inspecting multiple data packets and other related data in a packet-switching device or hardware description language (HDL) simulation thereof. The application GUI follows a standard two-panel selector pattern, in which the left side panel 804 is used to select a data object from within a hierarchical tree of related data objects. Nodes within that hierarchical tree can be expanded to access lower level data objects. For any given selected data object (such as a packet or list of packets) in the left hand source tree, the right hand panel 806 allows more details related to the selected data structure to be inspected, including the values of leaf-level data fields within the structure.

Figure 9:
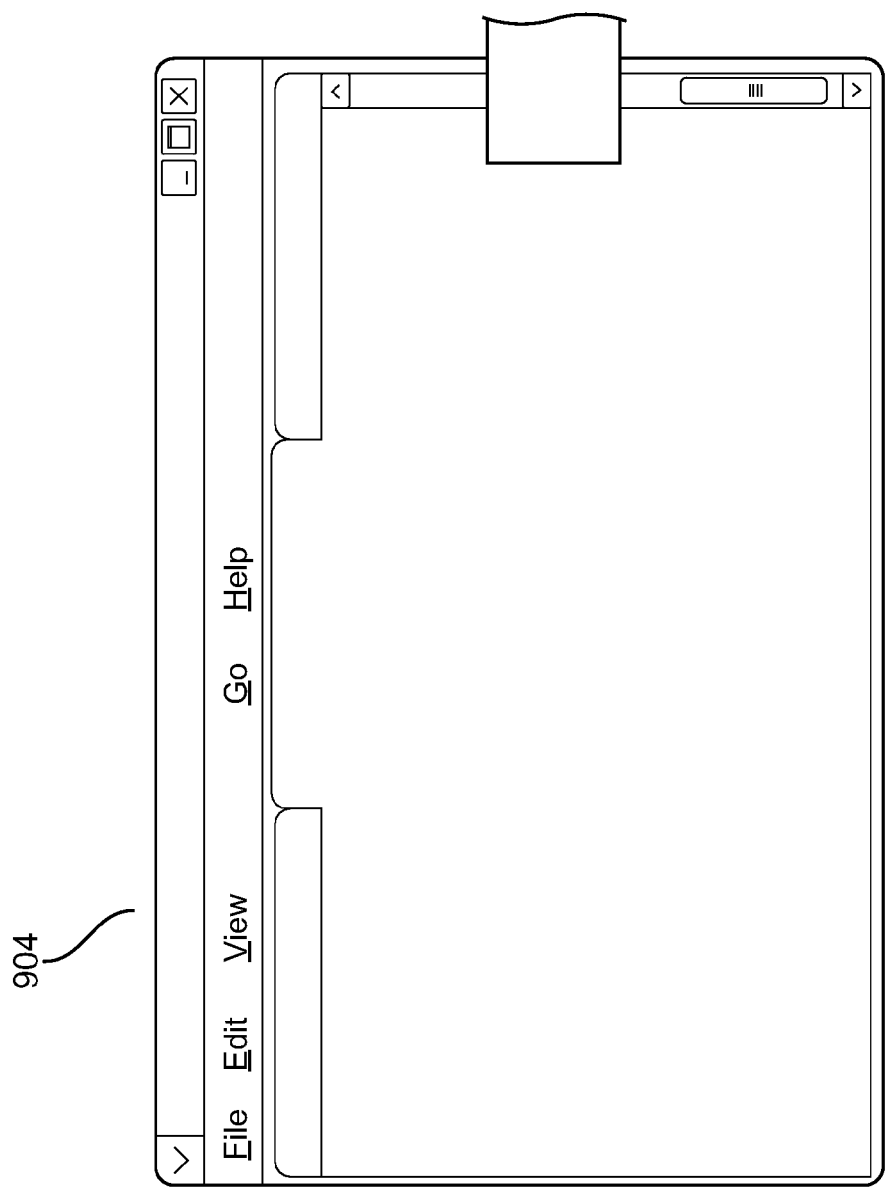
FIG. 9 shows the user interface of FIG. 8 undergoing a test.
Figure 9:
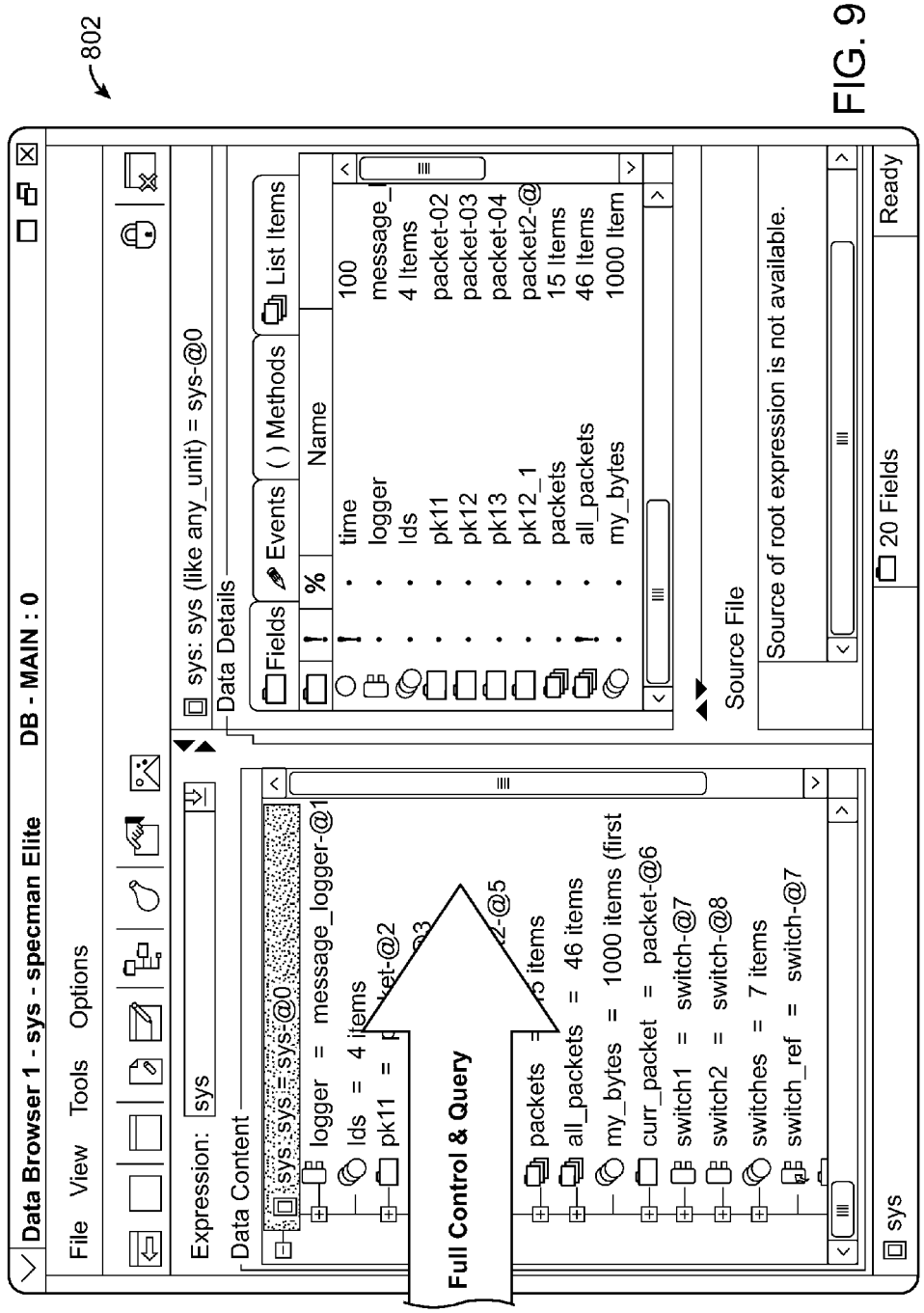

FIG. 9 graphically shows the GUI 802 being processed by the inventive verification system 904. The verification system 904 is shown controlling the GUI 802 of the Data Browser AUT. The verification system 904 steps through the execution of the testbench to drive the operation of the GUI 802. Query statements are employed within the testbench to gather data about the state of the GUI while it is undergoing the testing operations.

FIG. 7A-D provides an illustrative code listing in the "e" language for an example testbench that can be used to exercise the Data Browser GUI 802 shown in FIG. 8. This code illustrates some of the capabilities of the HVL approach to software GUI testing. In general, this testbench code emulates some typical/example user operations against the GUI 802. These user operations are related to selecting an object from the left-hand side tree 804, and verifying some properties associated with that, followed by expansion of a node within the tree. Various properties of the expanded tree are verified, and then a sequence of randomly generated leaf-level nodes (data packets) in the tree is "visited" by the test, and their related packet properties are verified. During this verification, randomly selected fields within the data packet are also verified.

The examples of FIGS. 7A-D show a particular syntax and format that may be employed to extend the "e" language to perform GUI testing. It is noted however, that the example program code is merely illustrative, and other formats and syntaxes may likewise be used to implement embodiments of the invention.

Figure 15:
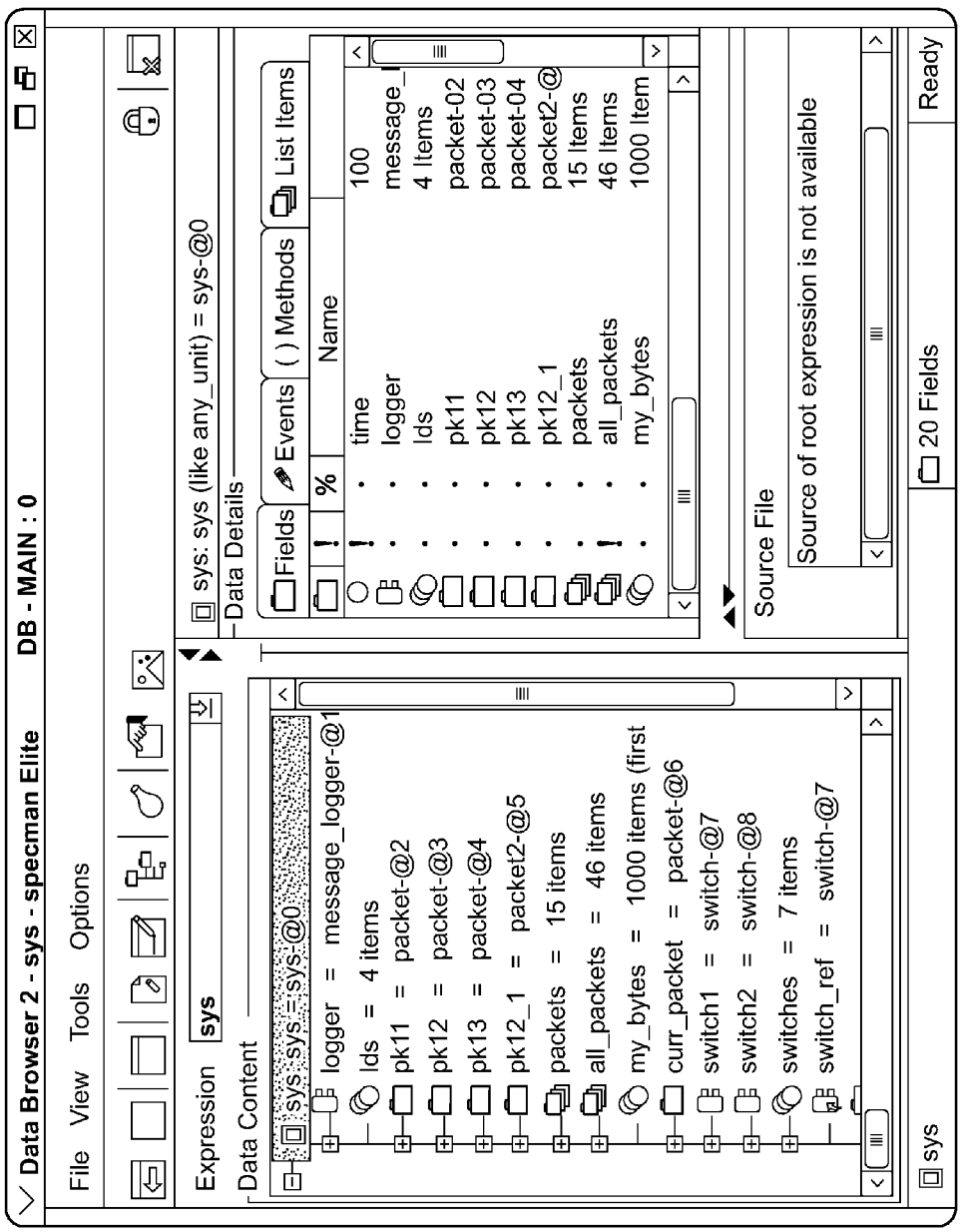
FIGS. 15-22 illustrate the user interface of FIG. 8 undergoing testing.
Figure 16:
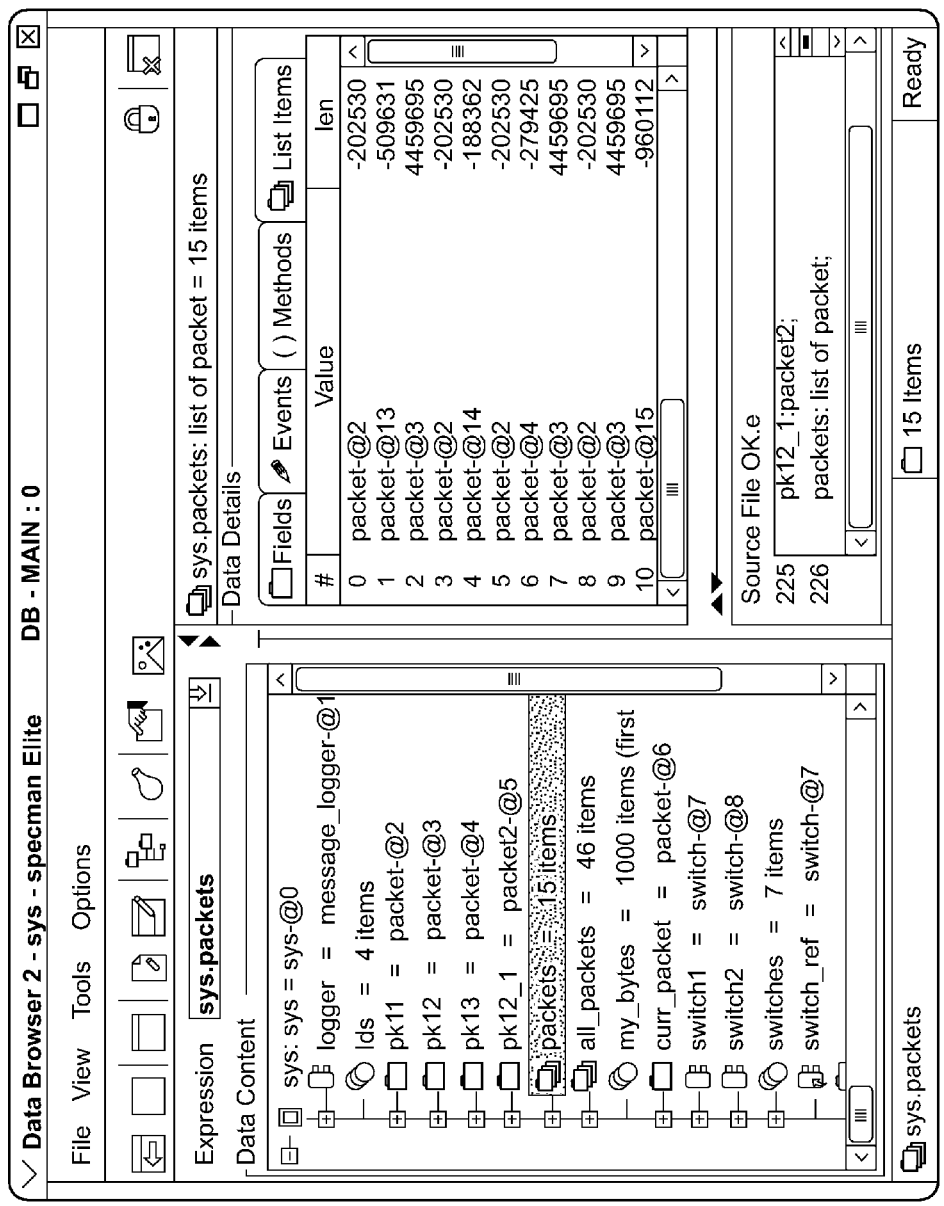

Code portion 702 provides an example of how one would launch a program under test using an "e" language implementation. A similar statement is shown in the code portion of FIG. 10. The general idea is that the HVL is extended to include methods to call the launching of the program for verification. In some embodiments, a mechanism can be implemented to impose a delay, e.g., a one second delay, to allow users to visually track and view the test. In the code example of FIG. 10, the code segment launches the Data Browser AUT represented by FIG. 8, e.g., via a method entitled "launch( )" of the testbench. The launch( ) method both launches the AUT, and establishes an initial communication with it after it starts up, as part of the communications protocol initialization described by FIG. 3 and utilizing the communications channel 114 described by FIG. 1. FIG. 15 illustrates bow the GUI of FIG. 8 might behave during test initialization under certain implementations.

One or more verification portions 704 and 706 can be included at or near the beginning of the program code. The verification portion is used, for example, to verify that the window title has the correct and expected title 708.

As shown in FIG. 7B, the example program code also includes code portions 710 to drive the GUI, to query the state of GUI elements, and to verify if the GUI is operating correctly based upon the test stimuli. For example, code portion 712 shows an example of syntax that can be used to check the contents of the data tree within the GUI. Code portion 714 shows an example of syntax that can be used to check header text within the GUI. Code portion 716 shows an example of syntax that can be used to check expansion of correct rows being added to the data tree within the GUI.

A particular section of code portion 710 is reproduced in FIG. 11 to illustrate the operations to drive the GUI, to query the state of GUI elements, and to verify if the GUI is operating correctly based upon the test stimuli. Some GUI Query methods from the snippet shown in FIG. 11 include:

1. CURR_WINDOW( ).get_title( )
2. TREE("DataTree").get_selected_row( )
3. TREE("DataTree").get_row_name( )

Figure 17:
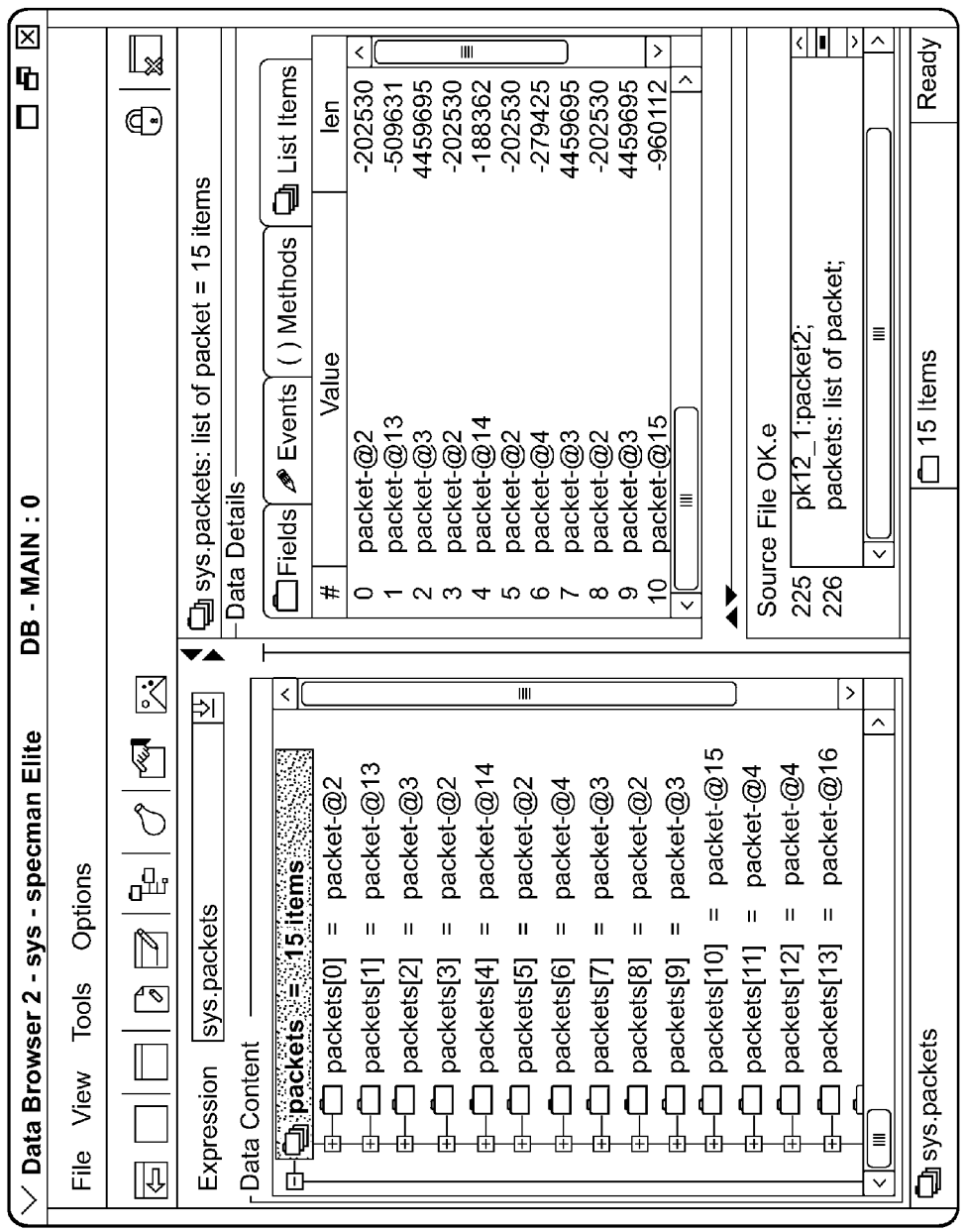

In addition, some GUI Command methods are shown:

1. COMBOBOX("ExpName").enter_item("sys.packets")
2. TREE("DataTree").expand_row(row);

The query methods allow the testbench to retrieve from the AUT the title of the current window, the index of the selected row within the left-hand-side tree panel, etc. The command/drive methods allowing the testbench to drive the AUT to enter an item "sys.packets" in the "ExpName" combobox, and to expand a particular row within the tree. As shown in FIG. 11, line 1102 executes a mechanism to expand a row in the left-hand side portion of the GUI of FIG. 8. An example of the effect of this operation upon the GUI of FIG. 8 is illustrated in FIG. 17. Line 1104 shows an example of syntax that can be used to query the GUI to check the contents of the data tree within the GUI. The API and verification engine within the verification system includes a mechanism to convert these methods to deliver drive commands and query commands to the plug-in at the AUT. The plug-in would convert these drive commands and query commands into the appropriate native format to drive and query the GUI.

Lines 1106 within FIG. 11 show examples of syntax that can be used to check the results of the query of line 1104 against expected values. This can be used to implement HVL code concepts which are used to advantageously test the GUI, e.g., by using the "e" language "check that" construct, which is used to verify (i.e. to check that), a desired or expected condition actually occurred. It will be understood by those skilled in the art that other languages and HVL constructs with similar semantics could be equally employed without departing from the spirit of the invention. The code example 1105 near the top of the sub-listing of FIG. 11 shows how the Data Browser is inspected to verify (check that) that the window title is actually "Data Browser" via the appropriate string pattern matching operation. Two subsequent checks 1106 near the bottom of the listing verify that the actual name of the root (index: 0) row of the tree is "sys" and check that the currently selected row corresponds to the expected string "packets".

One advantage of using a HVL-based approach to GUI testing as described herein is the ability to randomize tests which are effectively authored as templates using the HVL. Tests can be synthesized by randomly generating values each time the test is run. This concept is illustrated by the code portions 720 and 724 of FIGS. 7C and 7D. A portion of these sample code portions been re-stated in the code listing of FIG. 12. Here, the mechanism 1202 referred to as the "gen_new_num( )" method is used to generate a random row number, within the range of row values supported by the data tree in the right hand side panel of the GUI (that shows the packet field values in FIG. 8).

Figure 18:
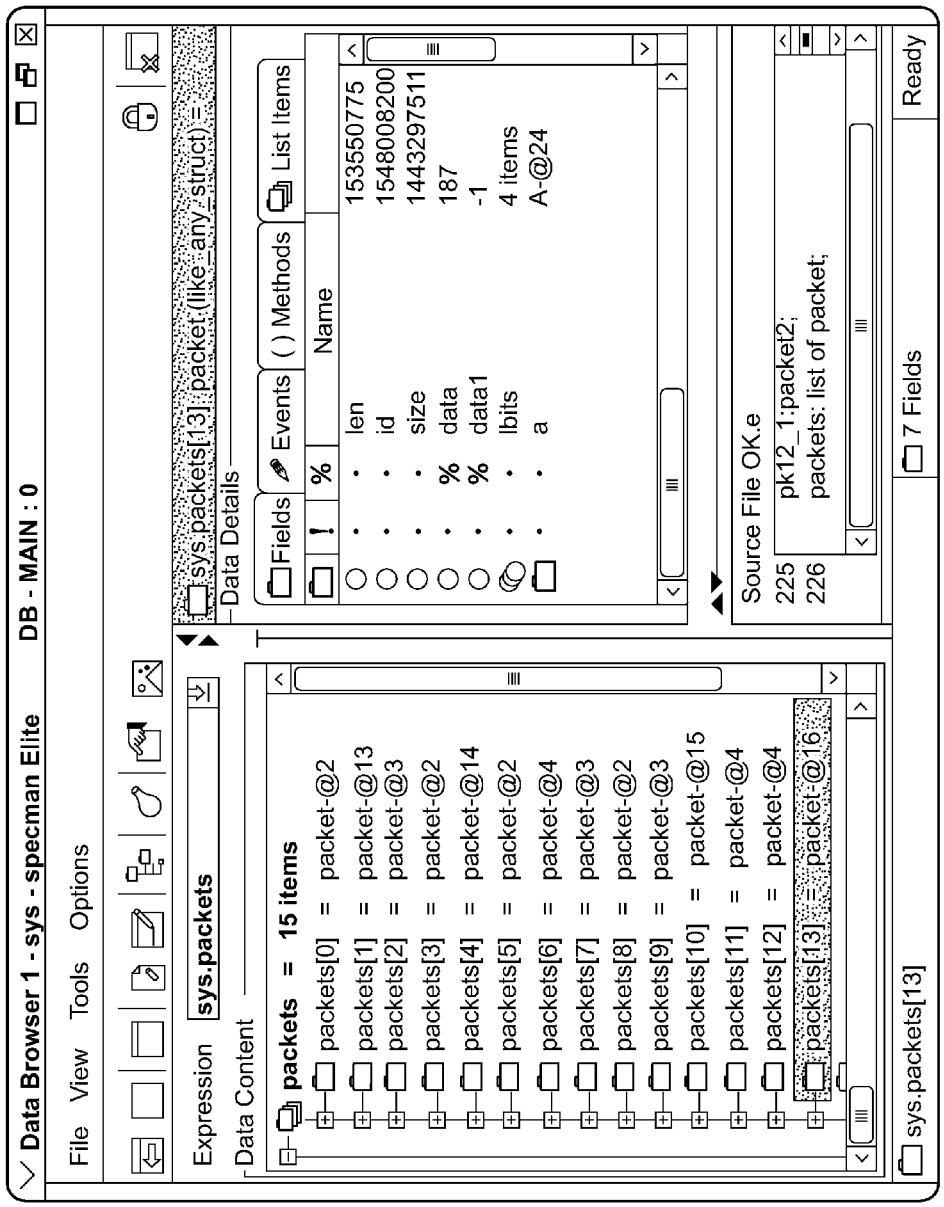
Figure 19:
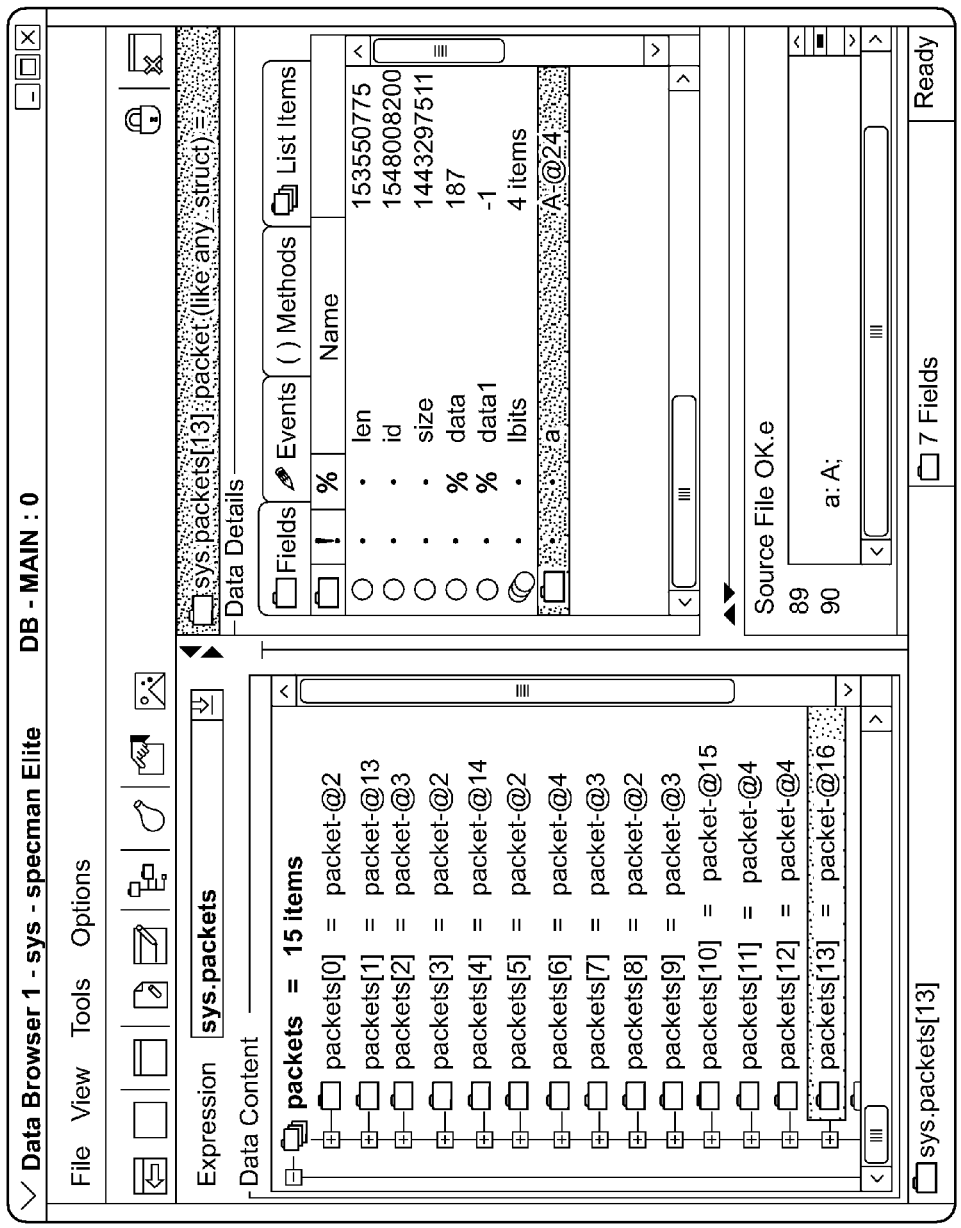
Figure 20:
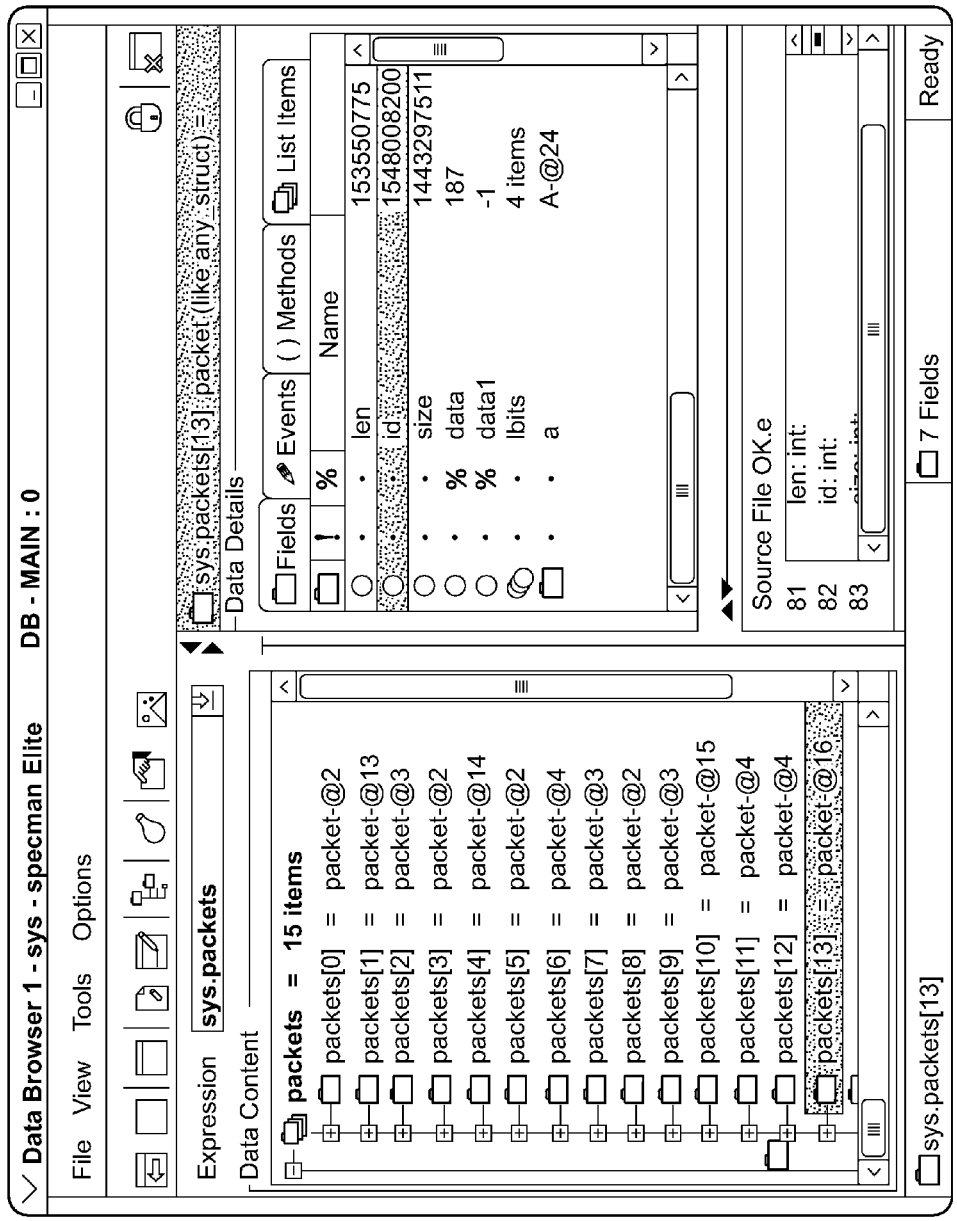

According to some embodiments, the random number is generated in a constrained manner, based upon a legal row that fits within the size of the child data structure. In effect, the new number is generated that is constrained by the number of children in the tree. Further, that randomly generated row is then passed as an argument to the "click_row( )" method 1204 of the child ("DataTree") tree on the right-hand side of FIG. 8. In other words, the randomly generated number is used to order the GUI to click on the appropriate row index and row elements to test. Examples of the AUT responding to this random row selection are shown in FIGS. 18, 19, and 20, in which packet "13" is selected, and "a" and "id" data fields within data packet 13 are respectively selected.

Figure 21:
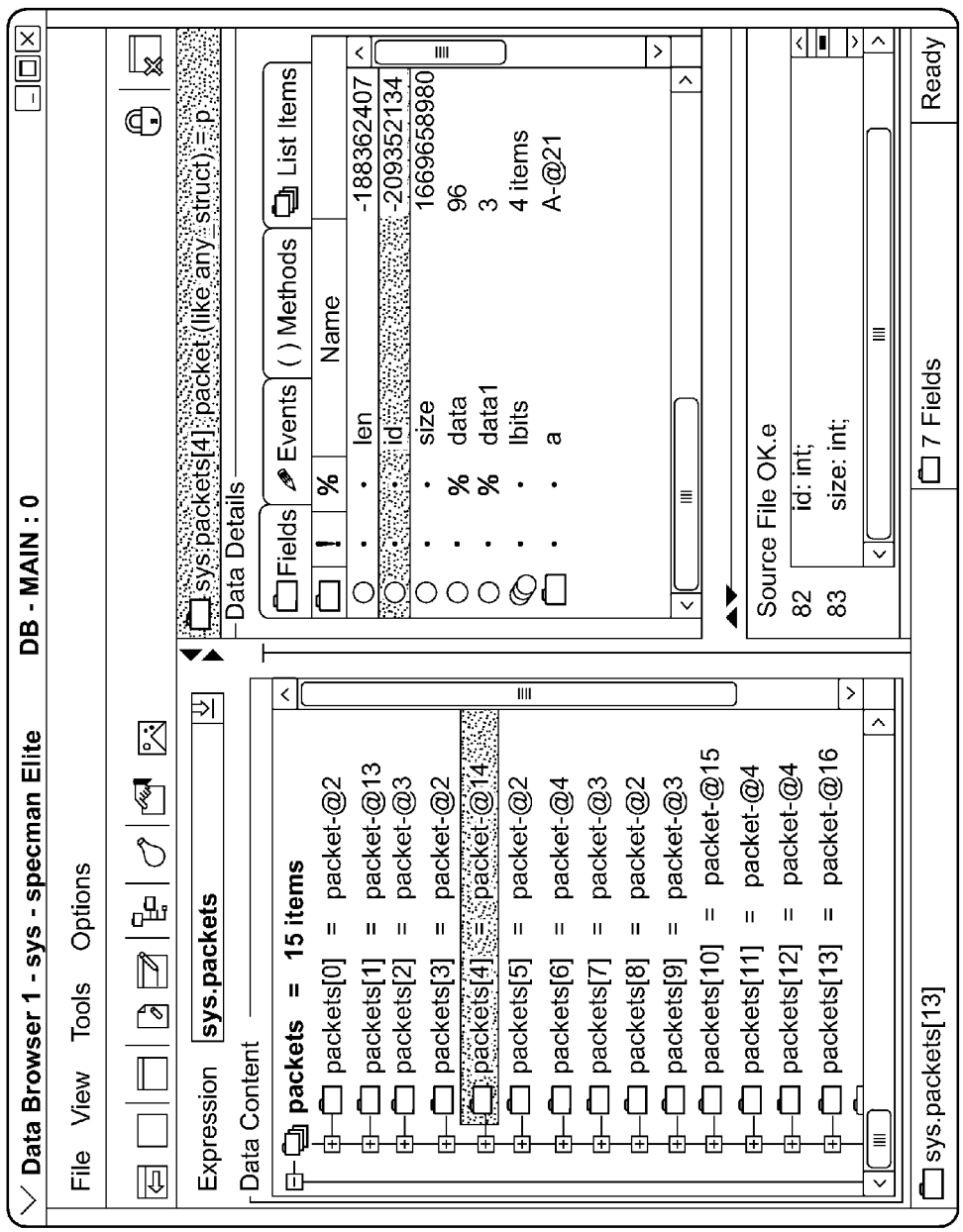
Figure 22:
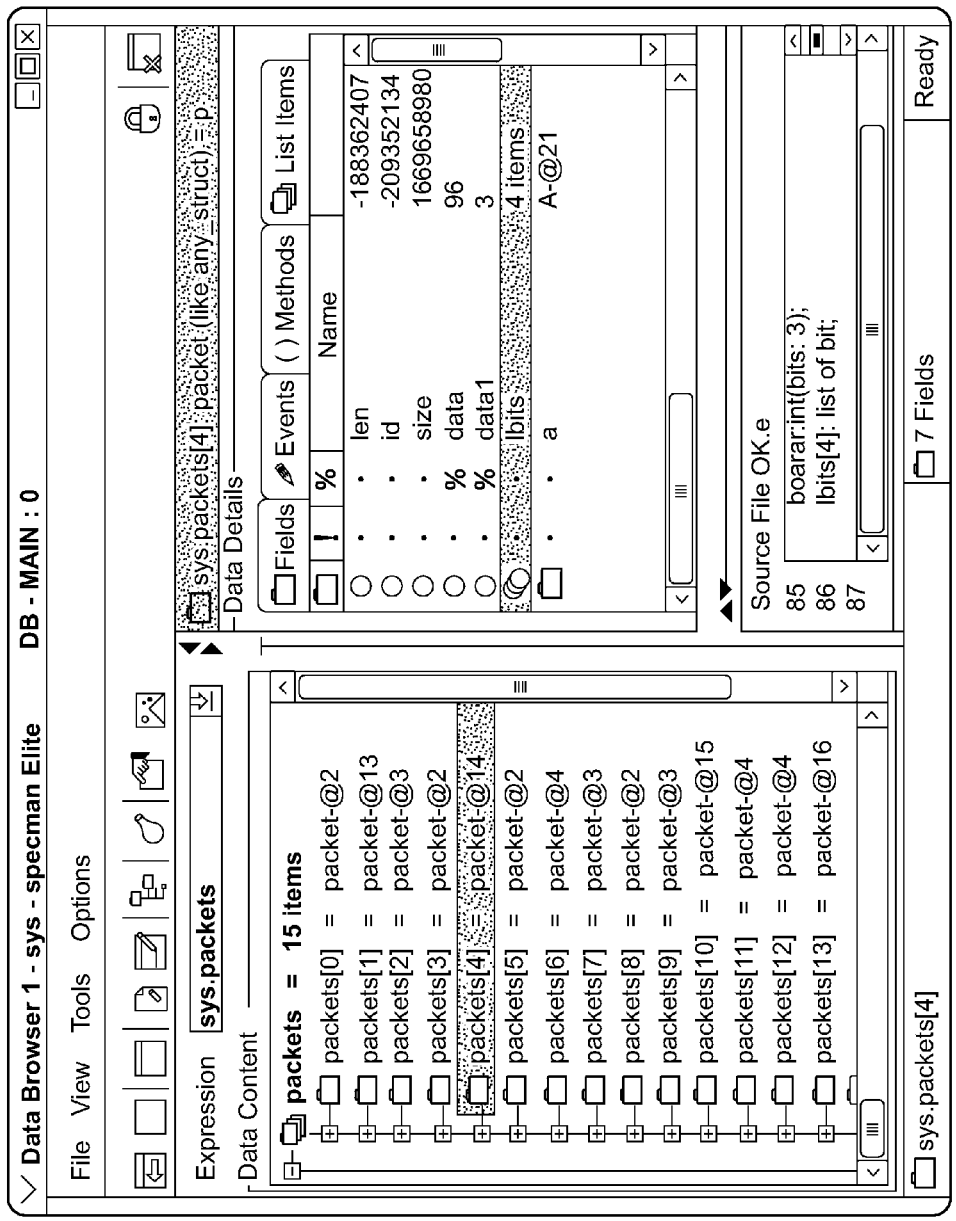

Similarly, a randomization of the selected packet index next selects packet[4] in the packet browser of the left-hand side panel FIG. 21, along with a correspond random selection of two of the data fields for that particular packet. These are fields "size" and "Ibits", illustrated by FIG. 21 and FIG. 22.

It is noted that the example test has been authored in such a way as to be usable with trees of an arbitrary size, and the method scales to both large and small trees accordingly. Hence, the GUI test author can generate a fully legal random selection of row/index tests from the single test template of FIGS. 7A-D. The example listing in FIGS. 7A-D is thus highly re-usable across multiple tests, regardless of the number of data packets present.

Further, some embodiments relate to constrained randomization to include the use of the "keeping" keyword as shown in the following code snippet, and can be equally used by GUI test writers to preserve required relationships. In the case of the following code snippet, a "child_num" value is randomly generated while constraining its value to be "less than" the number of available children.

```
// activate the random-walker under a random selected sub-tree
var child_num: uint;
gen child_num keeping {it < row1.get_child_count( )}; // random number
var row: gtx_tree_row = row1.get_child(child_num);
row.walk( );
```

The "e" language allows for other such constraints to be specified e.g. the generation of numbers within a particular range, etc.

Another advantage of embodiments of the present invention is the ability to instruct the testbench and verification environment to record coverage of certain GUI states. This advantage relates to the concepts of coverage checking and coverage metrics. To explain, consider that there is a potentially large number of the different variations and configuration combinations that can be set within the GUI. If data values are randomly generated, it is possible that certain combinations and corner cases are not exercised by a particular run of the test.

Figure 13:
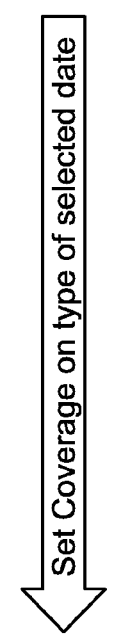
FIG. 13 shows a code portion for setting coverage.

In the example shown in FIG. 13, the "e" language event and cover constructs are used as shown in the sub-listing. In particular, consider that there may be multiple element types and multiple list kinds within the GUI. Embodiments of the invention provide a mechanism to determine and record cross-cover combinations (e.g., to generate intersections of multiple coverages), via HVL language constructs. In addition, negative GUI testing (testing to ensure that various error conditions are handled, appropriately) can also be efficiently addressed.

Figure 14:
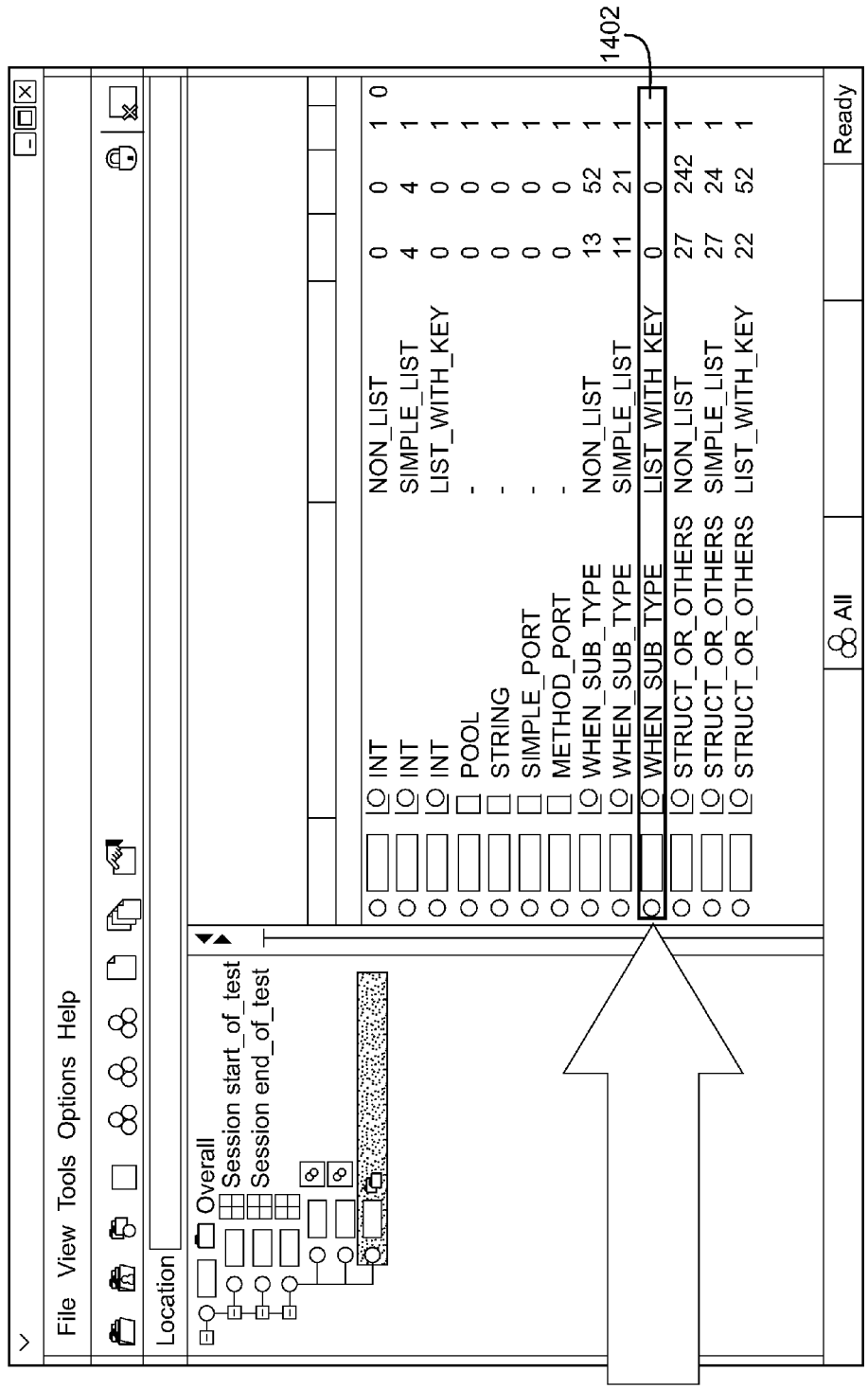
FIG. 14 shows an interface for displaying and managing regression testing according to some embodiments of the invention.

FIG. 14 shows an example interface that illustrates how such HVL language constructs can be measured and rendered by a coverage browser. Here, a cross of two coverage aspects is shown, displaying all the possible combinations of those aspects. Each combination has a coverage grade, and a corresponding visual indication, to represent the coverage completeness. Grades vary from 0 (for empty coverage or a coverage hole) indicated with a visual indicator, e.g., with red coloring, through partial coverage with grade>0 and <100 indicated with a different visual indicator, e.g., yellow coloring, up to a grade of 100 (for full coverage) indicated with yet another visual indicator, e.g., green coloring.

Coverage of particular states can be achieved during a given regression run, along with Hits/Goal metrics, and other factors. In the illustrated example, it can be seen that one particular combination 1402 (of list-with-key and when-subtype) was never checked, i.e., that particular cross-check combination was never verified during the execution of the testbench, thereby indicating a possible "hole" or lack of coverage in the testbench. The same techniques can be used without change to verify certain GUI states and cross-checks combinations of states with particular values of inputs are checked.

Embodiments of the invention can be configured to perform regression testing of the GUI. The reason to perform regression testing is because the GUI itself may change significantly across versions of the application, even though the underlying application may not. A test initially designed to follow a certain path through the GUI may no longer be able to follow that path in a subsequent revision of the software, since a button, menu item or dialog may not be where it used to be, may have been renamed or re-parented. In addition, and even more common in some embodiments, regression testing can be implemented to catch any new bugs created in the introduction of new features or based upon changes made to fix existing bugs.

Figure 23:
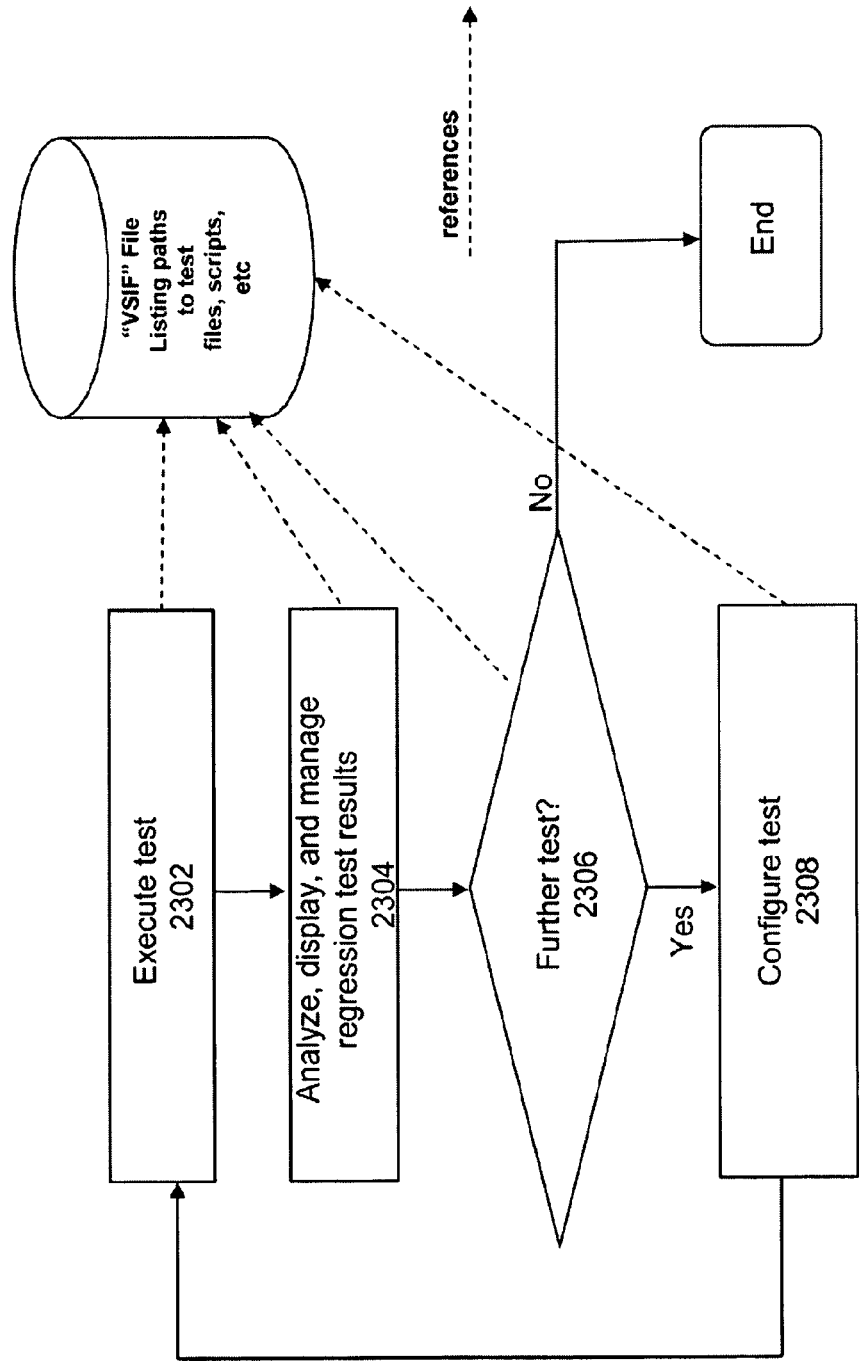
FIG. 23 shows a flowchart of a process for performing regression testing according to some embodiments of the invention.

FIG. 23 shows a flowchart of a process to implement regression test management according to one embodiment of the invention. At 2302, an application test is used to test a GUI application, e.g., using the approach described above. The test results for regression testing are collected, analyzed, and managed at 2304. In one embodiment, these actions are performed using a regression test management tool, such as the vManager tool available from Cadence Design Systems, Inc. of San Jose, Calif. The given file (in VSIF or verification session input file format according to some embodiments) lists the tests and scripts to be run, paths to "e" language files, etc. To create a test-suite and integrate it with the vManager regression manager, the test author creates a verification environment in the "e" language using an API as described herein. An application test is then created in the "e" language that uses the verification environment. Test-suite definition files are then created that relate to the various tests that were written.

Figure 24:
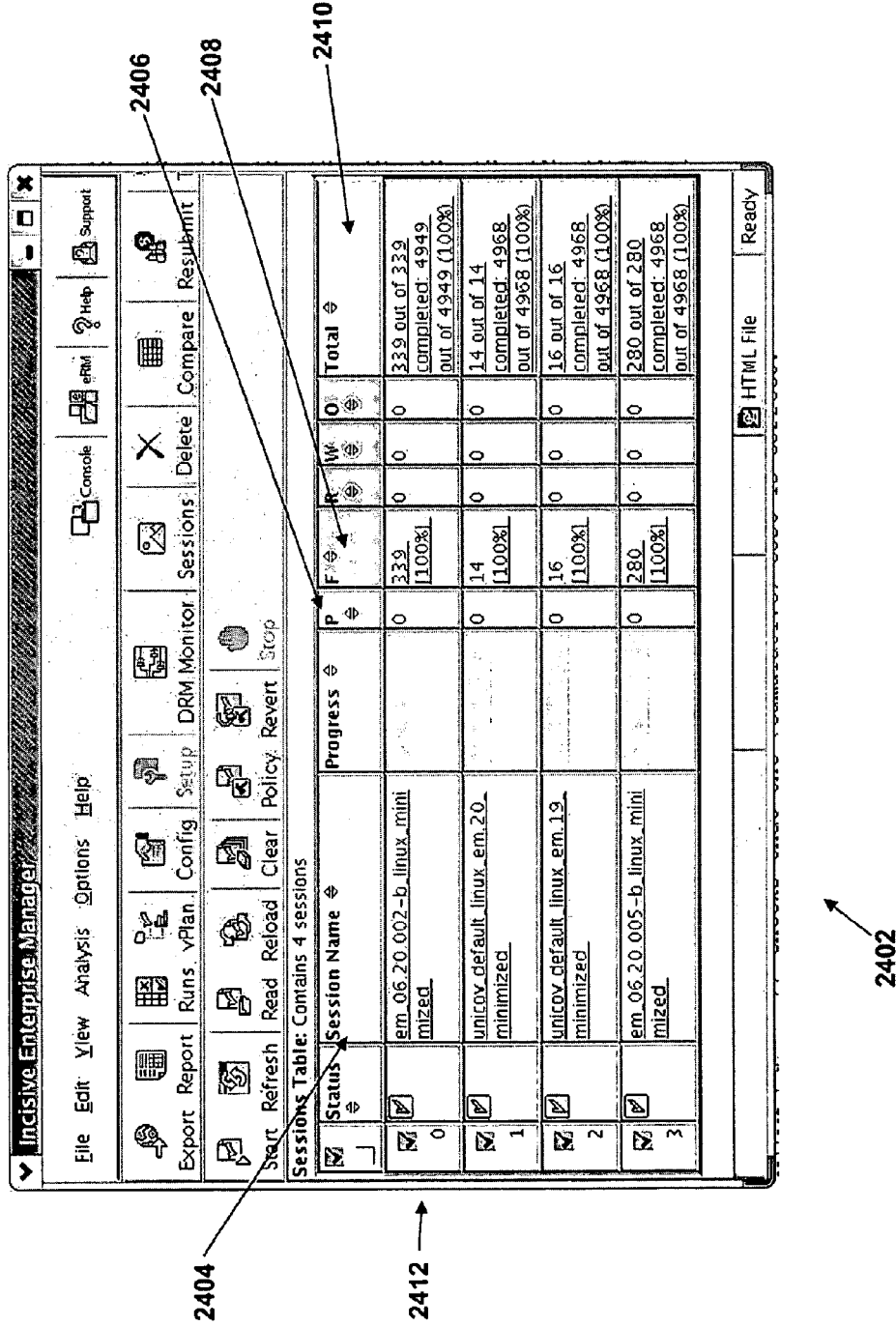
Figure 25:
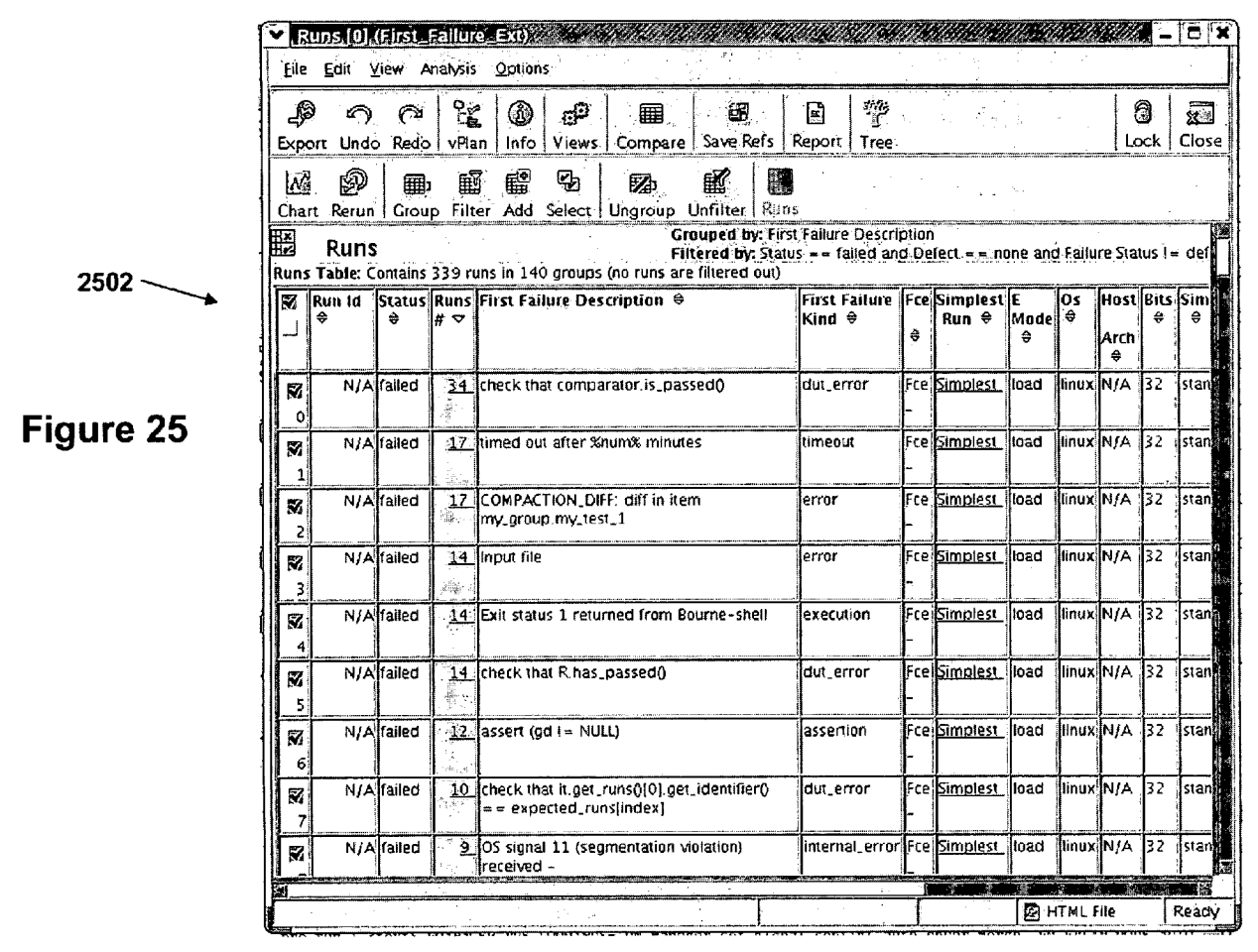

FIG. 24 illustrates an example interface 2402 for displaying functionality and analysis for performing regression test management. In particular, the interface 2402 includes a field 2404 to identify the session name of a particular test session. Fields 2406 and 2408 show the "pass" or "fail" results for the tests that were conducted for each session. Field 2410 provides a summary of the status for the session tests. For example, row 2412 in interface 2402 corresponds to a test session in which 339 and 4949 total tests were conducted (100 percent of the tests per field 2410), and where all of the tests correspond to test failures (field 2408). The interface 2402 can be configured to allow user selection of any session to cause another interface to be displayed which provide enhanced details for the selected session. For example, FIG. 25 shows an example interface 2502 that can be used to provide test details for each test session.

Returning back to FIG. 23, a determination is made at 2306 whether further testing is required. If so, then at 2308, the test can be configured, e.g., by changing some or all of the constraints or test conditions. The process then returns back to 2303 to execute the revised test.

Yet another advantage of the present approach is that the testbench that has been created in the verification language can be checked, debugged, and maintained using standard HVL debugging/browser tools. A debugger tool can be used to debug a GUI/CUI testbench, allowing tracking of the tests on a step-by-step basis. Some example functionality that can be applied to debug the testbench include: (1) setting breakpoints on lines, methods, on a change of a value; (2) exploring the stack when program execution stops; (3) adding watchpoints, that are evaluated automatically after each stop; (4) performing step-in, step-over and step-back HVL (such as "e") language program language statements; (5) choosing a variable and evaluate it; (6) ability to add/delete/disable/enable breakpoints; and (7) setting conditional breakpoints.

In another embodiment, a data browser window can be used to inspect HVL (such as "e") language program data, and can be used to inspect GUI/CUI Software Testbench program data, e.g., to inspect the stimuli as well as examining the verification environment instances.

The Specman Source Browser and Specman Source-Line debugger, available from Cadence Design Systems, Inc. of San Jose, Calif., are examples of suitable tools that can be used in conjunction with embodiments of the invention to debug and browse a testbench that has been created in the "e" language.

Therefore, what has been described is an advantageous and much improved approach for performing interface testing based upon a verification language. The present approach scales to very large and complex GUIs, and is minimally sensitive to relatively minor changes across software releases; even slight changes make existing tests unusable in existing GUI automated testing software. Therefore, the invention significantly eliminates or reduces overhead in test maintenance. Test case operation is independent of changes in fonts, window colors or sizes. The invention allows for the creation of re-useable GUI Verification IP, and addresses the common tendency for legacy feature testbenches to become diluted/irrelevant by maintaining original test intent throughout the lifetime of a software product.

The present approach can be configured to provide GUI Toolkit independence, and as a result, operating system independence as well. A GUI can be re-implemented in a different/faster/better toolkit (e.g. ported from Tcl to Qt or Java) and the prior written tests able to continue to run via switching in a different AUT plug-in. This allows for a GUI to be ported to a different OS (via Toolkit independence), and the prior existing regression tests to go along with it without needing to expend significant porting effort or cost. This further allows reuse of test-cases for various operating environments and data content, and allows sharing of verification IP components for generic components and even potentially creating commercial IP verification for common components. This approach also provides for straight-forward GUI testing logic by reflecting the "real" GUI components in the verification environment API In some embodiments, the approach removes requirement that all states be exhaustively exercised in order to guarantee good coverage and allows explicit analysis of coverage metrics, including cross combinations (intersections) of states. The user can have confidence for GUI state coverage measurement (which users of more simple line-of-code based coverage methods cannot). Extremely focused testing can be implemented as desired, which can avoid the clutter of irrelevant events (which tend to be densely populated in log file based methods). Embodiments allow for constraint-based randomized tests, which further allows for a "monte carlo" approach to testing where exhaustive testing is not possible due to lack of resources. Randomized tests can be conducted in conjunction with directed tests.

Another advantage is that the present approach requires less manual regeneration of tests. The test methodology is expandable and can be customized to support specific and unusual GUI components in specific applications.

In some implementations, a dedicated verification environment is provided for GUI application testing. This gives the ability to formally enter and capture a test plan, including desired coverage metrics, as well as the ability to execute and track a test plan. The user can easily inspect and/or analyze results of running a test plan, can re-run failed tests, can modify the tests to improve the actual coverage, and can effectively manage a testplan containing thousands of tests.

According to one embodiment, the invention is based on languages that have been expressly designed for dealing with similar problems i.e. large complex and sequence-related states. Existing languages and corresponding set of tools can be used that gained a significant volume of user experience and represent the market leader in the verification arena.

Improved regression creation and management is also provided. This allows for easy browsing of GUI regression test pass/fail status from within a single environment, and also allows for easy replay of failing tests to verify bug fix via automated preservation of random seeds associated with failing tests.

Advanced debugging functionality may be implemented with the invention. This allows for step-by-step execution of the test for debugging purposes, using a professional source-code debugger. This, in conjunction with the coverage analysis also allows for easy determination of important conditions which have not been verified, e.g., where sequence of operations A has been done in conjunction with all combinations of some other set of inputs B. It is noted that any debugging functionality may be suitably used in conjunction with the invention, including existing debugging functionality. In some embodiments, the "e" language is extended to implement the invention where existing debugging functionality can be used without any change.

System Architecture Overview

Figure 26:
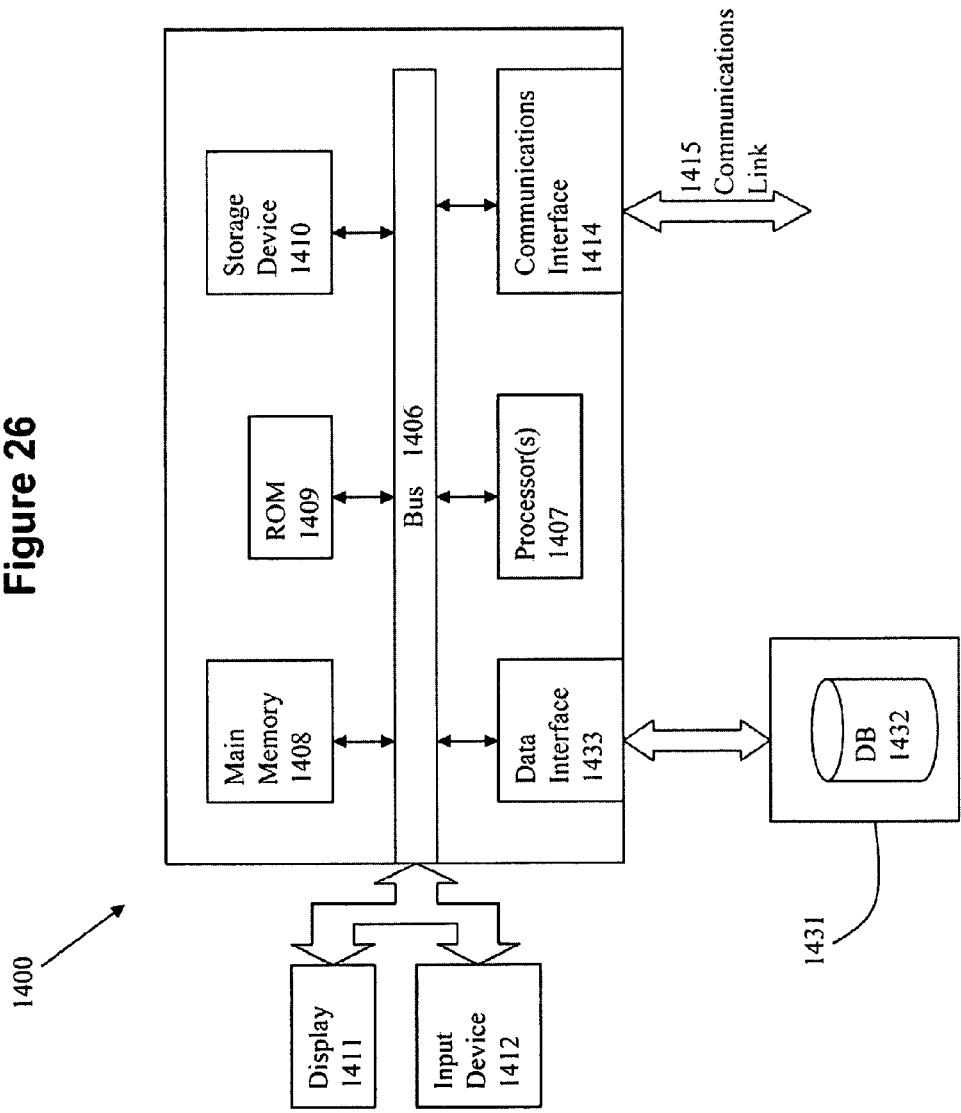
FIG. 26 shows an example computing system with which the invention can be implemented.

FIG. 26 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for testing a user interface for an application comprising:
    extending a hardware verification language by defining one or more custom libraries such that the extended hardware verification language can be used to interface with a user interface to a software application in addition to hardware designs, wherein the hardware verification language is different from a programming language used to create the user interface to the software application, and is a programming language specifically designed for verification of hardware designs, and wherein the extended hardware verification language is extended by providing an API (applications programming interface) corresponding to the e language;

generating a test for the user interface to the software application written in the extended hardware verification language;

using the test written in the extended hardware verification language to drive one or more elements of the user interface to the software application;

collecting data resulting from driving the user interface to the software application using the test;

analyzing the data from driving the user interface to the software application; and displaying analysis results or storing the analysis results in a computer readable medium.

2. The method of claim 1 in which the test comprises randomly generated test elements.

3. The method of claim 2 in which the randomly generated test elements are constrained to allowable values.

4. The method of claim 2 in which the test is authored using a template, where at least one or more specific values for the test is randomly generated.

5. The method of claim 1 in which the test comprises a specific sequence of actions.

6. The method of claim 1 in which the test is re-used for a different application user interface.

7. The method of claim 1 further comprising performing regression testing upon the user interface to the software application.

8. The method of claim 7 in which the regression testing comprises multiple tests, a randomly generated test, passed/fail test checks, or automatically re-run tests.

9. The method of claim 7 in which the regression testing is performed using a hardware regression testing tool.

10. The method of claim 1 further comprising coverage analysis.

11. The method of claim 10 in which state coverage is analyzed.

12. The method of claim 10 in which low or missing coverage is identified.

13. The method of claim 10 in which a coverage grade is generated for the test.

14. The method of claim 1 in which the data is collected by querying the application interface.

15. The method of claim 1 in which the user interface to the software application comprises a graphical user interface, web-based interface, or character-based interface.

16. The method of claim 1 in which a naming mechanism is used to refer to a specific component within the user interface to the software application.

17. The method of claim 1 in which the test is debugged using a verification language debugging tool.

18. The method of claim 17 in which the verification language debugging tool performs the act of (a) setting breakpoints on lines, methods, change of a value; (b) exploring a stack when program execution stops; (c) adding watchpoints, that are evaluated after a stop; (d) performing step-in, step-over and step-back program language statements; (e) choosing a variable for evaluation; (f) adding/deleting/disabling/enabling breakpoints; or (g) setting conditional breakpoints.

19. The method of claim 1, wherein the hardware verification language is e.

20. A system for testing a user interface for an application, comprising:

a memory configured to hold executable code comprising instructions for testing a user interface to a software application;

a processor communicable with the memory, configured to execute the executable code;

a test written in an extended hardware verification language, wherein the hardware verification language has been extending by defining one or more custom libraries such that the extended hardware verification language can be used to interface with the user interface to the software application in addition to hardware designs, and wherein the hardware verification language is different from a programming language used to create the user interface to the software application, and is a programming language specifically designed for verification of hardware designs, and wherein the extended hardware verification language is extended by providing an API (applications programming interface) corresponding to the e language;

and wherein the test written in the hardware verification language is configured to drive one or more elements of the user interface to the software application.

21. The system of claim 20 comprising a testbench in communication with an application under test, in which the testbench comprises the test and the application under test comprises the user interface to the software application.

22. The system of claim 21 in which the application under test comprises a plug-in to interface with the testbench, wherein the plug-in is configured to interface with one or more types of applications.

23. The system of claim 22 in which the plug-in is extendable, and may be configured to interface with customized interface components.

24. The system of claim 21 in which the testbench comprises an applications programming interface, the applications programming interface being configured to interact with or implement the test.

25. The system of claim 20 in which the test comprises one or more components from a library.

26. The system of claim 20 in which multiple interface mechanisms are employed to test multiple applications under test.

27. The system of claim 20 in which the test addresses at least one or more of the classes that include an application, a window, a widget, or a verification manager.

28. The system of claim 20, wherein the hardware verification language is e.

29. A computer program product that includes a non-transitory computer readable storage medium, the computer readable medium comprising a plurality of computer instructions which, when executed by a processor, cause the processor to execute performing a process for testing a user interface to a software application, the process comprising:

extending a hardware verification language by defining one or more custom libraries such that the extended hardware verification language can be used to interface with the user interface to the software application in addition to hardware designs, wherein the hardware verification language is different from a programming language used to create the user interface to the software application, and is a programming language specifically designed for verification of hardware designs, and wherein the extended hardware verification language is extended by providing an API (applications programming interface) corresponding to the e language;

generating a test for the user interface to the software application written in the extended hardware verification language;

using the test written in the extended hardware verification language to drive one or more elements of the user interface to the software application;

collecting data resulting from driving the user interface to the software application using the test;

analyzing the data from driving the user interface to the software application; and displaying analysis results or storing the analysis results in a computer readable medium.

30. The computer program product of claim 29 in which the test comprises randomly generated test elements.

31. The computer program product of claim 29 in which the test is reused for a different application user interface.

32. The computer program product of claim 29 further comprising performing regression testing upon the user interface to the software application.

33. The computer program product of claim 29 further comprising coverage analysis.

34. The computer program product of claim 29 in which the test is debugged using a verification language debugging tool.

35. The computer program product of claim 29, wherein the hardware verification language is e.

* * * * *